United States Patent

Sato

Patent Number: 5,941,934
Date of Patent: Aug. 24, 1999

[54] CURRENT POSITION CALCULATING DEVICE

[75] Inventor: Hiroyuki Sato, Yamato, Japan

[73] Assignee: Xanavi Informatics Corporation, Kanagawa-ken, Japan

[21] Appl. No.: 08/660,898

[22] Filed: Jun. 7, 1996

[30] Foreign Application Priority Data

| Jun. 9, 1995 | [JP] | Japan | 7-143559 |
| Jun. 9, 1995 | [JP] | Japan | 7-143560 |
| Jun. 9, 1995 | [JP] | Japan | 7-143566 |

[51] Int. Cl.$^6$ .......................... G01C 21/00; G08G 1/123
[52] U.S. Cl. .......................... 701/217; 701/208; 701/211; 340/995
[58] Field of Search .................. 701/207, 208, 701/217, 224, 220, 221; 340/995

[56] References Cited

U.S. PATENT DOCUMENTS

| 4,999,783 | 3/1991 | Tenmoku et al. | 364/450 |
| 5,060,162 | 10/1991 | Ueyama et al. | 364/449 |
| 5,155,688 | 10/1992 | Tanaka et al. | 364/454 |
| 5,311,173 | 5/1994 | Komura et al. | 340/995 |
| 5,345,388 | 9/1994 | Kashiwazaki | 364/449 |
| 5,404,307 | 4/1995 | Odagawa | 364/454 |
| 5,422,639 | 6/1995 | Kobayashi et al. | 340/988 |
| 5,523,765 | 6/1996 | Ichikawa | 342/451 |

FOREIGN PATENT DOCUMENTS

| 0 302 736 A1 | 8/1988 | European Pat. Off. . |
| 0 391 647 A2 | 4/1990 | European Pat. Off. . |
| 0 514 887 A2 | 5/1992 | European Pat. Off. . |
| 63-148115 | 6/1988 | Japan . |

*Primary Examiner*—Michael J. Zanelli

[57] ABSTRACT

A microprocessor 24 detects turn start and turn finish of a vehicle on the basis of outputs of various sensors 11, 12 and 13, and during this operation, the microprocessor 24 successively sets a current position to a middle point of a next link every time a predetermined condition is satisfied. While the current position is shifted from the middle point of a link to the middle point of a next link, the vehicle travel azimuth output from the sensor is corrected to approach to the azimuth of the link by an amount corresponding to the difference between the link azimuth of the just-previous middle point and the vehicle travel azimuth, and the current position is displayed on the basis of the corrected travel azimuth and the travel distance. Information on each link is obtained form a road map which is stored in a CD-ROM 15 and in which roads are expressed by an assembly of links. With this device, the current position can be displayed in the vicinity of a road on a road map on which the vehicle runs, even on a curve which is not accurately displayed on the road map.

9 Claims, 18 Drawing Sheets

CURRENT POSITION CALCULATING DEVICE

BACKGROUND OF THE INVENTION

1. Field of the Invention

The present invention relates to a current position calculating device which is mounted in a mobile object such as a vehicle or the like and measures a travel distance, a travel direction, etc. of the mobile object to calculate a current position of the mobile object on the basis of the measurement result.

2. Description of Related Art

In a conventional current position calculating device for calculating the current position of a vehicle running on a road, the current position of the vehicle is generally calculated on the basis of a travel direction (azimuth) of the vehicle which is measured by an azimuth sensor such as a gyro, and a travel distance of the vehicle which is measured by a vehicle speed sensor or a distance sensor.

The travel distance of the vehicle is generally calculated by measuring the number of rotations of the output shaft of a transmission or a tire and then multiplying the measured number by a distance coefficient which corresponds to a distance at which the vehicle runs per one revolution of the tire.

Further, Japanese Laid-open Patent Application No. Sho-63-148115 discloses the following technique. That is, roads located within a predetermined region containing at the center thereof the current position of a vehicle, which is determined on the basis of a travel distance and an azimuthal variation (variation of the travel direction of the vehicle), is extracted from a road map. Thereafter, on the basis of the correlation between the presumed current position and each of the extracted roads, the current position is corrected so as to be located on a road which has the highest correlation with the presumed current position, thereby correcting an estimation error of the current position which is determined on the basis of the travel direction and the travel distance of the vehicle. In many cases, the correlation between the presumed current position and the road is presumed on the basis of the distance between the presumed current position and the road, or the difference between the travel azimuth (direction) of the vehicle and the azimuth of the road (extending direction of the road).

This technique is called as a map matching technique because the presumed current position of the vehicle is corrected so as to be matched to a road. According to the map matching technique as described above, the precision of the calculation of the current position can be enhanced.

SUMMARY OF THE INVENTION

According to the map matching technique as described above, the current position is corrected on the basis of a road map, and it is thus based on the assumption that the road map is accurate.

With respect to road maps which are used in a current position calculating device for a car navigation system or the like, the position and shape of each road map is generally expressed by a linkage, a, of straight lines as shown in FIG. 20. Accordingly, it is common for the actual shape of a road to not be correctly expressed at a curve (a portion having a curved-line shape), b, of the road or the like as shown in FIG. 20. At such a point, the road map does not correctly represent the actual road shape. Therefore, if the map matching technique, which uses the distance between the presumed position and the road and the azimuthal difference between the travel azimuth of the vehicle and the road azimuth to establish the correlation between the presumed position and the road, is applied irrespective of such a situation, the current position is likely to be set on an incorrect road.

On the other hand, even if the map matching technique is not applied and the current position is directly determined on the basis of the travel distance and the azimuth variation, the following problem occurs.

According to a car navigation system, in order to indicate a presumed current position to a driver, a road map which surrounds the presumed current position is generally displayed together with a mark indicating the current position on the road map. However, if the map matching technique as described above is not applied, the mark indicating the current position is not necessarily displayed on a road. Particularly in the case where a road map does not accurately represent the actual road shape at a curve or the like, the mark indicating the current position may be displayed at a position far away from a road on the road map which corresponds to an actual road on which the vehicle runs, even when the vehicle current position determined on the basis of the travel distance and the azimuth variation is accurate. That is, although the vehicle runs on a road, the current position is erroneously displayed at a position away from the road. This is a very unnatural display to a driver. Further, the situation also arise a case where the driver cannot grasp the current position.

Therefore, an object of the present invention is to provide a current position calculating device which can display the current position of a vehicle so that the current position is nearer to a proper road even when the vehicle runs on a curve.

In order to attain the above object, according to a first aspect of the present invention, a current position calculating device which is mounted, for example in a vehicle, and calculates the current position of the vehicle, includes azimuth detecting means for detecting a travel azimuth of the vehicle, distance calculating means for calculating a travel distance of the vehicle, storage means for storing road maps, travel azimuth correcting means for correcting the travel azimuth of the vehicle detected by the azimuth detecting means, and current position calculating means for successively presuming the current position on a road on the basis of both a road map read out from the storage means and a relative displacement of the vehicle which is determined from the current position of the vehicle which is previously calculated, the corrected travel azimuth and the travel distance, and display means for displaying the current position of the vehicle together with the road map read out from the storage means on the basis of the presumed current position, wherein the travel azimuth correcting means corrects the travel azimuth detected by the azimuth detecting means by an amount corresponding to the difference between the presumed road azimuth and the travel azimuth of the vehicle detected by the azimuth detecting means when the current position calculating means estimates the current position, or an amount corresponding to the past record of the difference so that the difference is reduced.

According to the current position calculating device of the present invention, the travel azimuth correcting means corrects the travel azimuth detected by the azimuth detecting means by the amount corresponding to the difference between the presumed road azimuth and the travel azimuth of the vehicle detected by the azimuth detecting means when the current position calculating means estimates the current position, or the amount corresponding to the past record of the difference so that the difference is reduced. Therefore, the current position thus calculated is set to be nearer to an accurate road, and thus the current position can be displayed to be near to the road even on a curve or the like.

Further, in order to attain the above object, according to a second aspect of the present invention, a current position calculating device which is mounted in a vehicle and calculates the current position of the vehicle, includes azimuth detecting means for detecting a travel azimuth of the vehicle, distance calculating means for calculating a travel distance of the vehicle, storage means for storing road maps, current position calculating means for presuming a temporary current position which is a vehicle current position calculated on the basis of the calculated preceding current position and a relative displacement of the vehicle determined on the basis of the travel azimuth and the travel distance of the vehicle, and verifying the temporary current position with a road map read out from the storage means to estimate the most probable current position as the latest current position, and turning judgment means for judging whether the vehicle is turning, wherein if the turning judgment means judges that the vehicle is turning, the current position calculating means sets, as the latest current position, the temporary current position which is the current position determined on the basis of the preceding calculated current position of the vehicle and the relative displacement of the vehicle which is calculated from the travel azimuth and the travel distance of the vehicle.

According to the current position calculating device, the turning judgment means judges whether the travel azimuth of the vehicle is turning. If the turning judgment means judges that the vehicle is turning, the current position calculating means sets, as the latest current position, the temporary current position which is the current position determined on the basis of the preceding calculated current position of the vehicle and the relative displacement of the vehicle which is calculated from the travel azimuth and the travel distance of the vehicle. Therefore, by verifying the presumed temporary current position with the road map read out from the storage means, the vehicle can be prevented from being presumed to run on an incorrect road.

In order to attain the above object, according to a third aspect of the present invention, a current position calculating device which is mounted in a vehicle, and calculates the current position of the vehicle, includes azimuth detecting means for detecting a travel azimuth of the vehicle, distance calculating means for calculating a travel distance of the vehicle, storage means for storing road maps, current position calculating means for successively presuming the current position on a road on the basis of both a road map read out from the storage means and a relative displacement of the vehicle which is determined from the current position of the vehicle which is previously calculated, the corrected travel azimuth and the travel distance, and target point arrival judging means for successively setting as a candidate road, a road which is, in front of the vehicle in the travel direction, linked to the road on which the preceding calculated current position exists when the travel azimuth indicates the turning of the vehicle, and judging whether the azimuth difference between the travel azimuth of the vehicle and the candidate road is below a predetermined value when the vehicle runs by the distance of a route extending from the preceding presumed current position to a target point set in the neighborhood of a middle point of the candidate road after the preceding current position is presumed, wherein if the target point arrival judging means judges that the azimuth difference between the vehicle travel azimuth and the candidate road is below the predetermined value, the current position calculating means estimates the position of the target point as the current position.

According to the current position calculating device thus constructed, when the travel azimuth indicates that the vehicle is turning, the target point arrival judging means successively sets as a candidate road, a road which is, in front of the vehicle in the travel direction, linked to the road on which the preceding calculated current position exists when the travel azimuth indicates the turning of the vehicle, and judging whether the azimuth difference between the travel azimuth of the vehicle and the candidate road is below a predetermined value when the vehicle runs by the distance of a route extending from the preceding estimated current position to a target point set in the neighborhood of a middle point of the candidate road after the preceding current position is presumed. If the target point arrival judging means judges that the azimuth difference between the vehicle travel azimuth and the candidate road is below the predetermined value, the current position calculating means estimates the position of the target point as the current position. The display means displays the current position of the vehicle together with the road map which is read out from the storage means on the basis of the presumed current position.

That is, even on a curve on which the vehicle turns, a road on which the vehicle is running is presumed on the basis of the vehicle travel azimuth and the road azimuth at the target point which is in the neighborhood of the middle point of the road which is presumed to have the smallest azimuthal error from an actual road, and the current position is presumed to be at the target point provided on the road, whereby the road on which the vehicle runs is more accurately presumed, and the current position is displayed in the neighborhood of the road.

DETAILED DESCRIPTION OF THE PREFERRED EMBODIMENTS

Preferred embodiments according to the present invention will be described with reference to the accompanying drawings.

Figure 1:
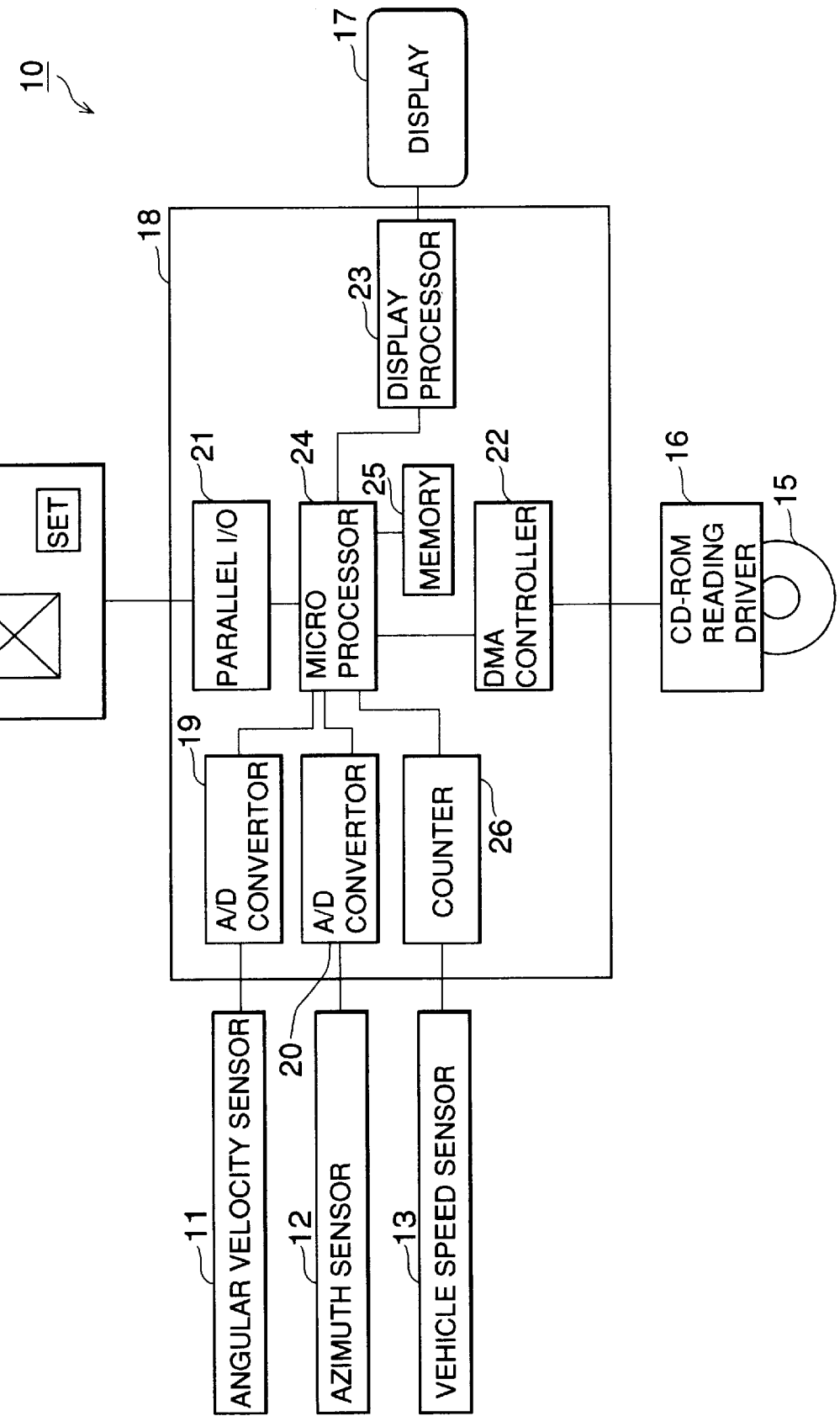
FIG. 1 is a block diagram showing the construction of a current position calculating device according to an embodiment of the present invention.

FIG. 1 is a block diagram showing the construction of a current position calculating device of an embodiment according to the present invention.

As shown in FIG. 1, the current position calculating device 10 includes an angular velocity sensor 11 for detecting a yaw rate of a vehicle to detect variation of a travel azimuth of the vehicle, a geomagnetic sensor 12 for detecting geomagnetism to detect a travel azimuth of the vehicle, and a vehicle speed sensor 13 for outputting a pulse at a time interval which is proportional to the rotation speed of the output shaft of the transmission of the vehicle.

The current position calculating device 10 further includes a display 17 on which marks indicating a current position and a road map surrounding the current position, etc. are displayed, a switch 14 for receiving a user's (driver's) instruction for changing a display scale of a map to be displayed on the display 17, a CD-ROM 15 for storing digital map data, a driver 16 for reading out map data from the CD-ROM 15, and a controller 18 for controlling the operation of each peripheral device as described above.

According to this embodiment, the digital map data contain road data which comprise coordinate values indicating end points of plural links, road width data indicating the road width of roads, a highway flag indicating whether a road is a highway or a general road, etc.

The controller 18 includes an A/D converter 19 for converting a signal (analog) of the angular velocity sensor 11 to a digital signal, an A/D converter 20 for converting a signal (analog) of the geomagnetic sensor 12 to a digital signal, a counter 26 for counting the number of pulses output from the vehicle speed sensor 13 in a time interval of 0.1 second, a parallel I/O 21 for detecting whether the switch 14 is pressed and inputting the detection result, a DMA (Direct Memory Access) controller 22 for transmitting map data read out from the CD-ROM 15, and a display processor 23 for displaying a map image on the display 17.

The controller 18 further includes a microprocessor 24 and a memory 25. The microprocessor 24 receives the signal of the angular velocity sensor 11 which is obtained through the A/D converter 19, the signal of the geomagnetic sensor 12 which is obtained through the A/D converter 20, the number of output pulses of the vehicle speed sensor 13 which is counted by the counter 26, the detection result of pressing (i.e., press or non-press) of the switch 14 which is input through the parallel I/O 21, and the map data which are obtained from the CD-ROM 15 through the DMA controller 22. The microprocessor performs various processing on the basis of these signals to calculate a current position of the vehicle, and controls a display processor 23 to display the current position on the display 17.

Figure 2:
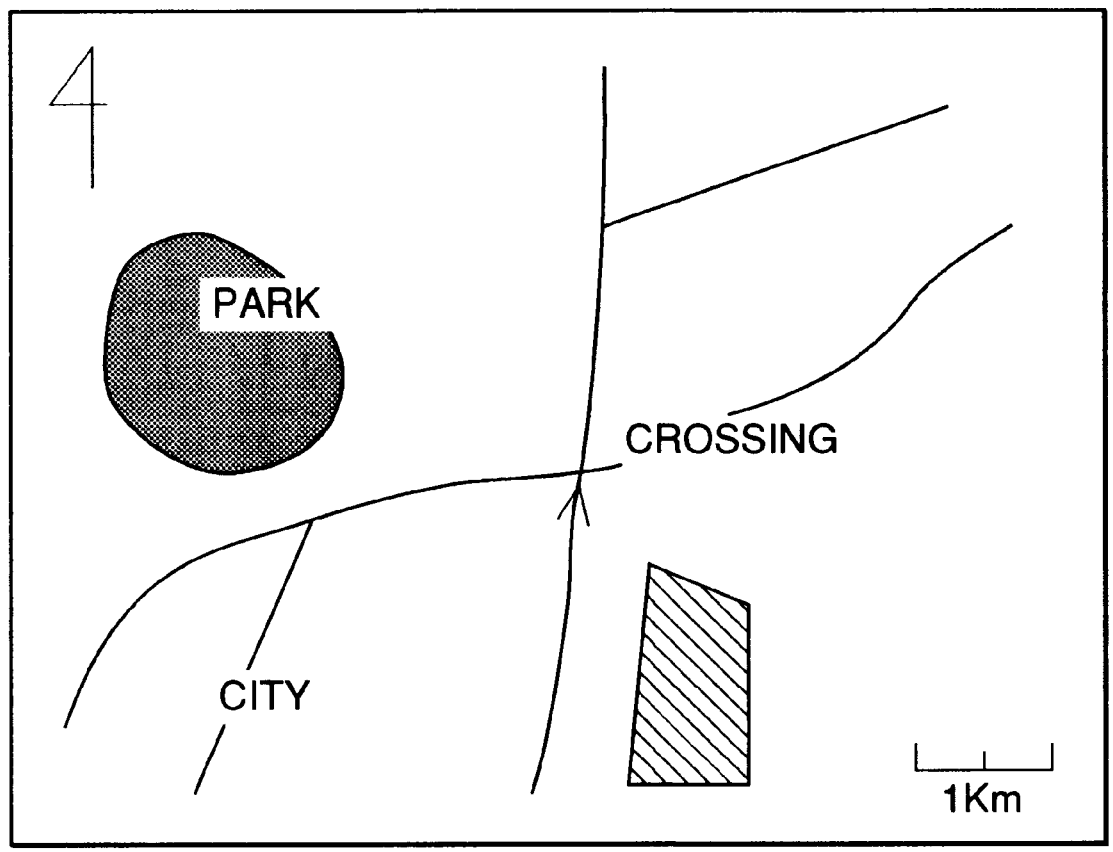
FIG. 2 is a diagram showing a display of a road map and a current position according to the embodiment of the present invention.

As shown in FIG. 2, the current position of the vehicle is indicated by displaying an arrow mark or the like on the display while the arrow mark or the like is superposed on a map which has been already displayed on the display 17, whereby the current position of the vehicle is notified to the user on the map. The memory 25 includes a ROM in which a program defining the content of processing (described later) to realize the above operation etc. are stored, and a RAM which is used as a work area when the microprocessor 24 performs the processing.

The operation of the current position calculating device 10 thus constructed will be described. The operation of the device 10 can be divided into two operations, that is, a current position determining operation for determining a display candidate point representing the current position of the vehicle on the basis of the travel azimuth and travel distance of the vehicle, and a display operation for displaying the current position and the vehicle azimuth thus obtained. These operations will be hereunder described in turn.

First, the current position determining operation for determining the current position of the vehicle on the basis of the vehicle travel azimuth and travel distance will be described.

This operation comprises plural processing operation, and of these processing operations, the following five operations are significant. A first processing operation is turn judgment processing for judging the travel status of the vehicle every time the vehicle runs by 2 m, that is, every time a vehicle runs by 2 m it is judged whether the vehicle advances in a straight line, starts its turning, proceeds with its turning (under turn) or finishes its turn. A second processing operation is straight line advance processing which is performed every time the vehicle runs by 20 m while the vehicle is advancing in a straight line. A third processing operation is turn-start processing which is performed at the time when the vehicle starts to turn. A fourth processing operation is turn-proceeding processing which is performed every time the vehicle runs by 2 m while the vehicle is turning. A fifth processing operation is turn-finish processing which is performed at the time when the vehicle finishes turning.

Each processing operation as described above, which is executed by the microprocessor 24, will be described hereunder.

Figure 3:
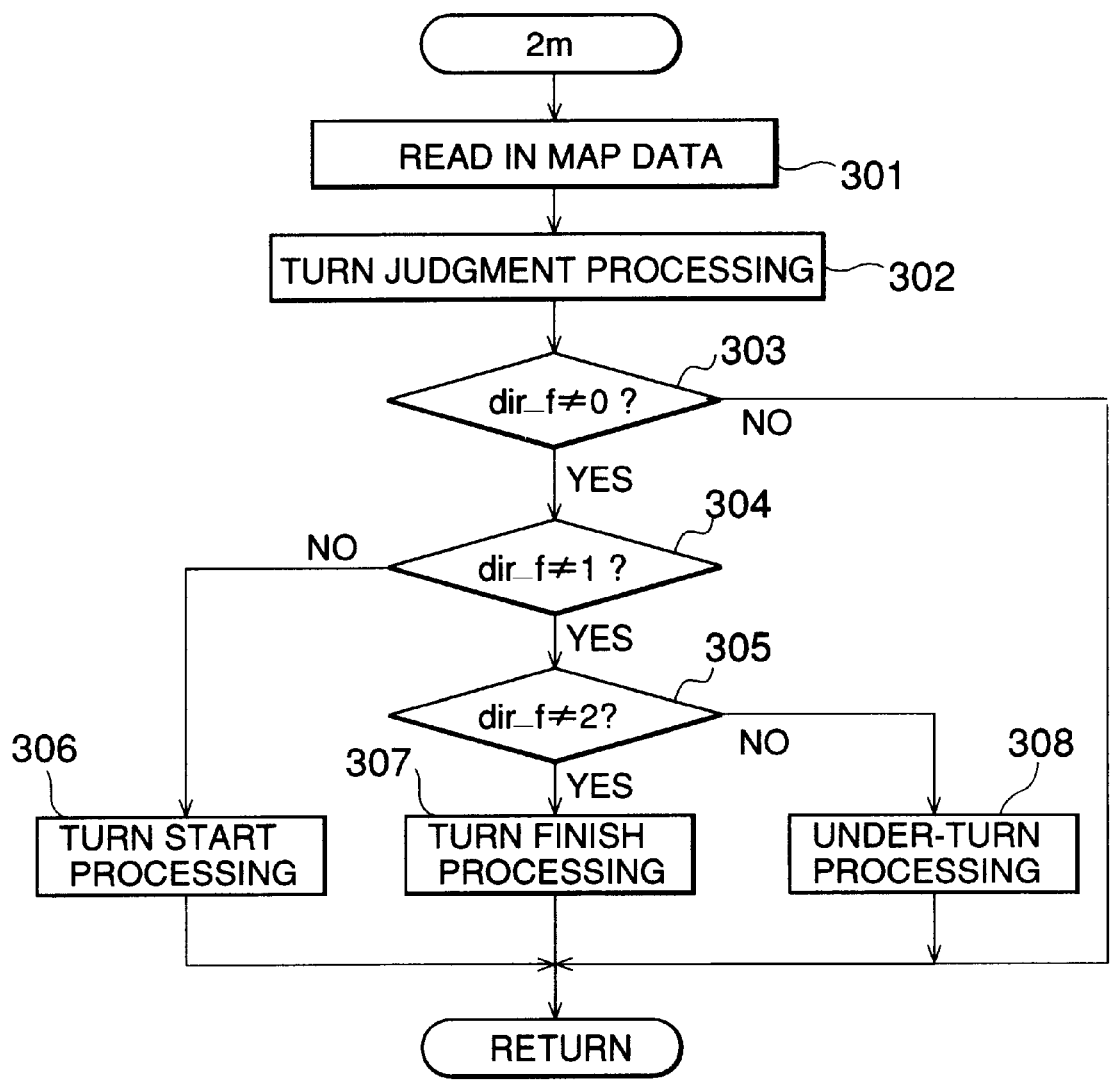
FIG. 3 is a flowchart showing the process flow to execute turn judgment processing, turn start processing, under-turn processing, and turn finish processing.

FIG. 3 shows a flowchart for each processing operation (turn judgment processing, turn start processing, under-turn processing and turn finish processing) which is performed every time the vehicle runs by 2 m.

In these processing operations, map data are first read out (step 301), and the turn judgment processing is carried out (step 302). As described later, during the turn judgment processing, dir_f is set to zero if the vehicle advances in a straight line, dir_f is set to 1 when the vehicle starts to turn, dir_f is set to 2 if the vehicle is turning, and dir_f is set to 3 if the vehicle finishes turning. "dir_f" represents a turn judgment flag or the like which represents the travel status of the vehicle.

In steps 303, 304 and 305, the vehicle travel status is judged on the basis of the value of dir_f. That is, if dir_f is set to 1, the turn start processing is performed (step 306), If dir_f is set to 2, the under-turn processing is performed (step 308), and if dir_f is set to 3, the turn finish processing is carried out (step 307).

In the case where dir_f is set to 0, the straight line advance processing as described above is performed every time the vehicle runs 20 m.

Next, the turn judgment processing of the step 301 will be described.

Figure 4:
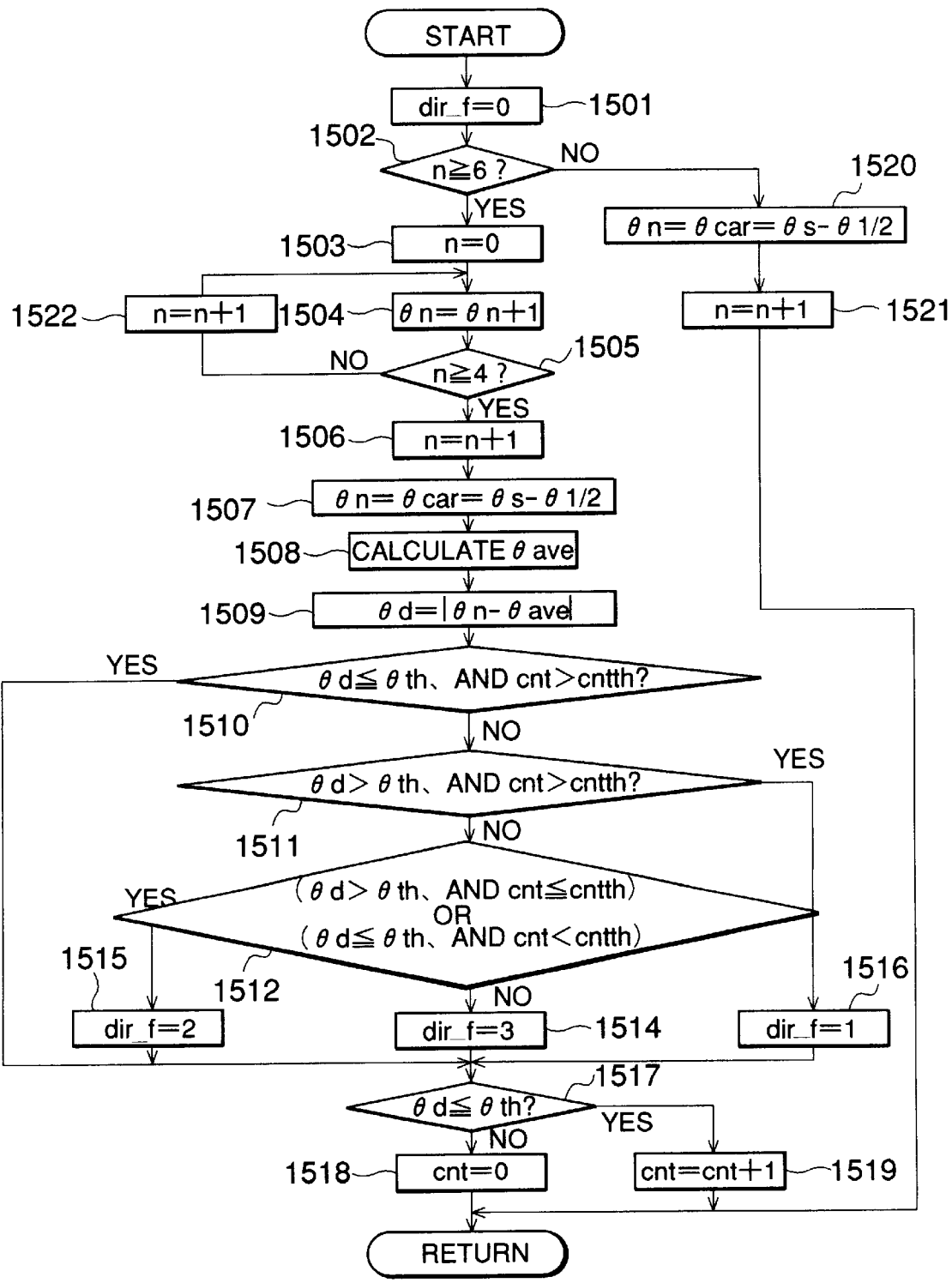
FIG. 4 is a flowchart showing the process flow of the turn judgment processing.

FIG. 4 shows a flowchart for the turn judgment processing.

During this processing operation, it is judged whether the vehicle advances in a straight line, starts turning, proceeds with its turning (under turn) or finishes turning, as described above.

In this processing operation, dir_f is first set to 0 to indicate the straight line advance status. Thereafter, the turn start, the under-turn state or the turn finish is judged on the basis of the vehicle travel azimuth θn in the following processing. In the following processing, a vehicle travel azimuth θs which is output from the sensor is not directly used, and in place of this value, a corrected vehicle travel azimuth θcar (=θs−θ½) is used as will be a vehicle travel azimuth (steps 1520, 1507). Here, as described later, the value of θ½ is calculated and renewed in each of the under-turn processing, the turn finish processing and the straight line advance processing.

In each of the under-turn processing, the turn finish processing and the straight line advance processing, as will be described later, in order to obtain a display candidate point, "θ½" is calculated as a half of the difference between the vehicle travel azimuth θs output from the sensor at the time when the display candidate point is obtained and the azimuth of a road on which the display candidate point exists. If no display candidate point exists on the road (in the case where a candidate point under a free state is selected as a display candidate point), "θ½" is set to 0. The vehicle travel azimuth θs which is output from the sensor means the vehicle travel azimuth which is determined on the basis of the output values of the geomagnetic sensor 12 and the angular velocity sensor 11.

In this embodiment, the vehicle travel azimuth θs is corrected so as to be more approximate to the azimuth of an actual road by using a corrected vehicle azimuth which is represented by θcar=θs−θ½. That is, in consideration of a possibility that the azimuth difference between the vehicle travel azimuth output from the sensor and the azimuth of the actual road occurs due to an error of the sensor or the like which is caused by magnetization of the vehicle, the vehicle travel azimuth θs output from the sensor is corrected by reducing the value of θ½ from the vehicle travel azimuth θs so that the azimuth difference therebetween is reduced to some extent.

When dir_f is set to 0 to indicate the straight line advance of the vehicle (step 1501), a current vehicle travel azimuth θn (n represents an integer) is calculated. The current vehicle travel azimuth θn thus calculated is compared with the average vehicle travel azimuth θave of the past six calculated vehicle azimuth values θ0 to θ5 to calculate the absolute value θd of the difference value between the current vehicle travel azimuth θn and the average vehicle travel azimuth θave. This calculation of the absolute value θd is repeatedly performed over a predetermined travel distance (at a predetermined frequency). At this time, if a current absolute value θd is below a predetermined threshold value θth, and if a frequency cnt at which it has been continuously judged until now that the absolute value θd of the difference value is below the threshold value θth is larger than a predetermined threshold value cntth, the vehicle is judged to advance in a straight line at present (step 1510), and thus dir_f is kept zero to indicate the straight line advance.

On the other hand, if the current absolute value θd as described above is larger than the predetermined threshold value θth, and if the frequency cnt at which the absolute values θd has been continuously judged until now to be below the predetermined threshold value θth is larger than the predetermined threshold value cntth, the vehicle is judged to start its turn (step 1511), and thus dir_f is set to 1 to indicate the turn start of the vehicle (step 1516).

Further, if the absolute value θd is larger than the predetermined threshold value θth and if the frequency cnt is below the predetermined threshold value cntth, or if the absolute value θd is smaller than the predetermined threshold value θth and if the frequency cnt does not reach the predetermined threshold value cntth, the vehicle is judged to proceed turning (under turning) (step 1512), and thus dir_f is set to 2 to indicate the under-turn (step 1515).

If the absolute value θd is below the predetermined threshold value θth and if the frequency cnt is equal to the predetermined threshold value cntth, the vehicle is judged to have finished its turn, and thus dir_f is set to 3 to indicate the turn finish of the vehicle (step 1514).

That is, when the frequency cnt of the judgment result that the absolute value (θd) of the difference value between the vehicle azimuth and the average (θave) of the past six vehicle azimuth values (θ0 to θ5) is below the predetermined value (θth) continues at a predetermined frequency (cntth+1), the straight line advance of the vehicle is judged. If the straight line advance would be judged the next time if the absolute value (θd) at the next time is below the predetermined value (θth), it is judged that the vehicle has finished turning. Further, the vehicle turn start is judged when the absolute value (θd) at this time is above the predetermined value (θth), although the straight line advance would be judged if the absolute time (θd) at this time is below the predetermined value (θth).

If the map matching is performed when the vehicle travel azimuth is not stable, an improper current position may be calculated or a current position could not be accurately calculated. However, according to this embodiment, the straight line advance or the turn of the vehicle is judged on the basis of the judgment as to whether the absolute value of the difference value between the current vehicle travel azimuth and the average value of the past vehicle travel azimuth values over a predetermined travel distance is below a predetermined value and this absolute value has been stable over a predetermined distance or more. Accordingly, the straight line advance processing as described later can be performed to calculate the current position through the map matching only when the vehicle travel azimuth is stable (only when the straight line advance is judged).

In FIG. 4, the steps 1520, 1521 and 1502 represent processing which is carried out immediately after the device of this embodiment is started, and successively accumulates the values of the vehicle travel azimuth θcar in the order from θ0 to θ5 until the number of measurements of the vehicle travel azimuth is equal to six. If six values of the vehicle travel azimuth are accumulated, this processing is temporarily ceased. At the time when the device is actuated, n is initialized to zero.

The steps 1503 to 1507 and 1522 represent the following processing operation. That is, the value θ0 is deleted from the six vehicle travel azimuth values θ0 to θ5 which have been accumulated until that time, and the values of θ1 to θ5 are shifted one by one to be set as new values θ0 to θ4. Subsequently, a current vehicle travel azimuth θs output from the sensor is taken in, and then it is corrected to be set as a new value θ5. These new past six values are used to calculate a new absolute value θd.

The step 1508 represents processing for calculating the average value θave of the past six corrected vehicle azimuth values (θ0 to θ5) as described above, and the step 1509 represents processing for calculating the absolute value θd of the difference value between the current corrected vehicle travel azimuth θn and the vehicle travel azimuth obtained in step 1508.

The steps 1510 to 1512 and the steps 1514 to 1516 represent processing for judging the straight line advance, the turn start, the under-turn and the turn finish, to settle the value of dir_f.

Finally, the steps 1517 to 1519 represents processing for counting the sequential frequency (number) cnt until now for the absolute value θd of the different values which are below the threshold value θth. The sequential frequency cnt thus obtained is used to judge the vehicle straight line advance, the turn start of the vehicle, the under-turn of the vehicle and the turn finish of the vehicle, as described above.

As described above, through the turn judgement processing, the judgment on the straight line advance, the start of the turn, the under-turn (under turning) and the finish of the turn is performed every time the vehicle runs by 2 m, and the value of dir_f is set to indicate the judgment result. Further, the vehicle travel azimuth Os output of the sensor is corrected to calculate θcar.

During the period for which the judgment result of the turn judgement processing as described above indicates the straight line advance, and thus the value of dir_f is set to zero, the turn start processing, the under-turn processing and the turn finish processing are not performed as shown in FIG. 3, and the straight line advance processing is performed every time the vehicle runs by 20 m.

Next, the straight line advance processing will be described.

Figure 5:
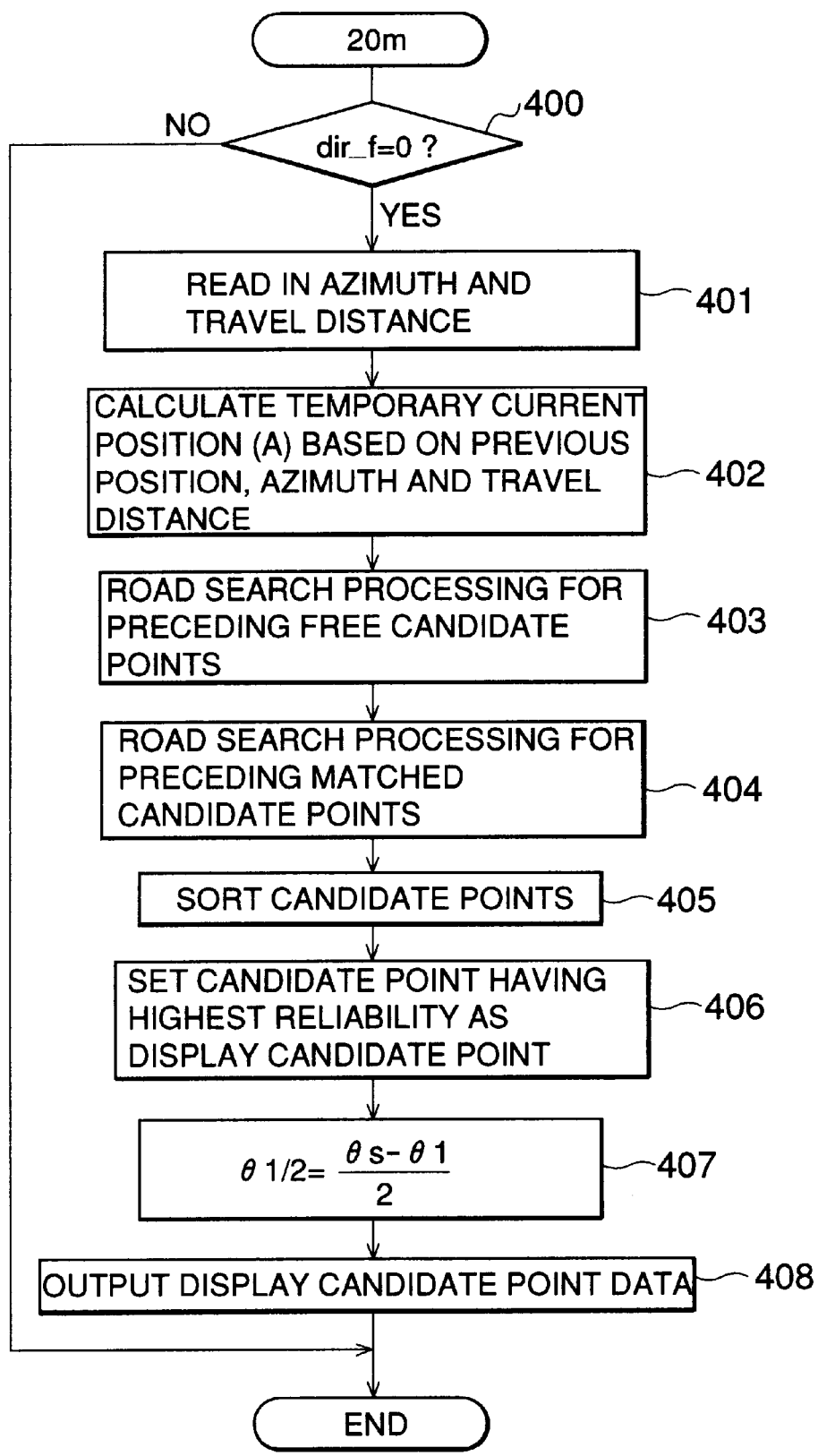
FIG. 5 is a flowchart showing the process flow of straight line advance (run) processing.

The straight line advance processing is used to calculate the current position of the vehicle with the map matching every time the vehicle runs by 20 m. FIG. 5 shows a flowchart for the straight line advance processing.

In this processing, it is first judged whether dir_f is set to zero (step 400). That is, it is judged whether the vehicle is under the straight line advance status at present. If no straight line advance status is judged, the processing is finished. Accordingly, this processing is not performed if any one of the turn start processing, the under-turn processing and the turn finish processing is judged.

If the straight line advance status is judged at present, a travel distance R at which the vehicle has run until now from the time when a preceding straight line advance processing or a turn finish processing is performed, and a current corrected vehicle travel azimuth θcar are read in (step 401). Subsequently, the travel amount (distance) of the vehicle is individually calculated in each of latitudinal and longitudinal directions on the basis of the above values.

Further, the travel amount of the vehicle in each direction is added to the position of each candidate point which is calculated by the preceding straight line advance processing, whereby a temporary current position (A) corresponding to the position at which the vehicle is presumed to exist at present is calculated for each candidate point which is calculated in the preceding straight line advance processing (step 402). The candidate point is (are) one or plural positions to be calculated in steps 403 and 404 as described later, which are possibly selected as candidates for the current vehicle position in the straight line advance processing, and the details thereof will be described later.

If there is no candidate point which was obtained in the preceding processing for calculating candidate points for the vehicle, for example, immediately after the device is actuated, a predetermined position is set as the position of a candidate point which is previously obtained to calculate the temporary current position (A).

Subsequently, only candidate points under a free state (hereinafter referred to as "free candidate points") as described later are subjected to road search processing for performing a matching operation with a road to determine one or plural candidate points and the reliability trst thereof (step 403). The free candidate point means a candidate point which cannot be matched on any road, and the reliability means a probability that each candidate point is the current position. The details thereof will be described later. The details of the road search processing (search candidate point selection processing) will be described later.

Subsequently, after the search candidate point selection processing is performed, only candidate points under a matching state (hereinafter referred to as "matched candidate points") as described later which are obtained in the preceding straight line advance processing are subjected to the road search processing to perform the matching operation with a road to determine one or plural candidate points and the reliability trst thereof (step 404). The matched candidate point means a candidate point which is matched on a road, and the details thereof will be described later.

Subsequently, these new candidate points are sorted (step 405) in accordance with the value of the reliability trst for each candidate point obtained in the steps 403 and 404. In this case, a candidate point C having the highest reliability is set as a display candidate point CD, that is, a candidate point to be displayed on the display 17. Accordingly, the position thereof, an accumulated error index es thereof (as described later), the reliability thereof, a status flag thereof representing whether the candidate point is under a matching state or free state, etc. are stored in a predetermined area of a RAM of a memory 25. In addition, the position, the accumulated error index es, the reliability trst, the status flag, etc. of each of candidate points other than the display candidate point are also stored in a predetermined area of the RAM (step 406). The device of the embodiment is designed so that data which are associated with seven candidate points can be stored. Accordingly, if eight or more candidate points are obtained through the processing of the steps 401 to 406 of FIG. 5, various data on seven candidate points of the above eight candidate points are stored in the reliability (trst) order from a larger trst value to a smaller trst value in the predetermined area of the RAM of the memory 25.

Thereafter, a half of the value which is obtained by reducing the azimuth θ1 of a road on which a selected display candidate point is located, from the vehicle travel azimuth θs output from the sensor (that is, θs−θ1), is set as θ½ (step 407), and finally the coordinate data of the display candidate point are output (step 408), thereafter finishing the processing. However, as described above, if a free candidate point is selected as a display candidate point, θ½ is set to zero.

Next, the details of the road search processing which is carried out to perform the road matching for only a preceding free candidate point in the step 403, and the road search processing which is carried out to perform the road matching on only a preceding matched candidate point in the step 404, will be described.

Figure 6:
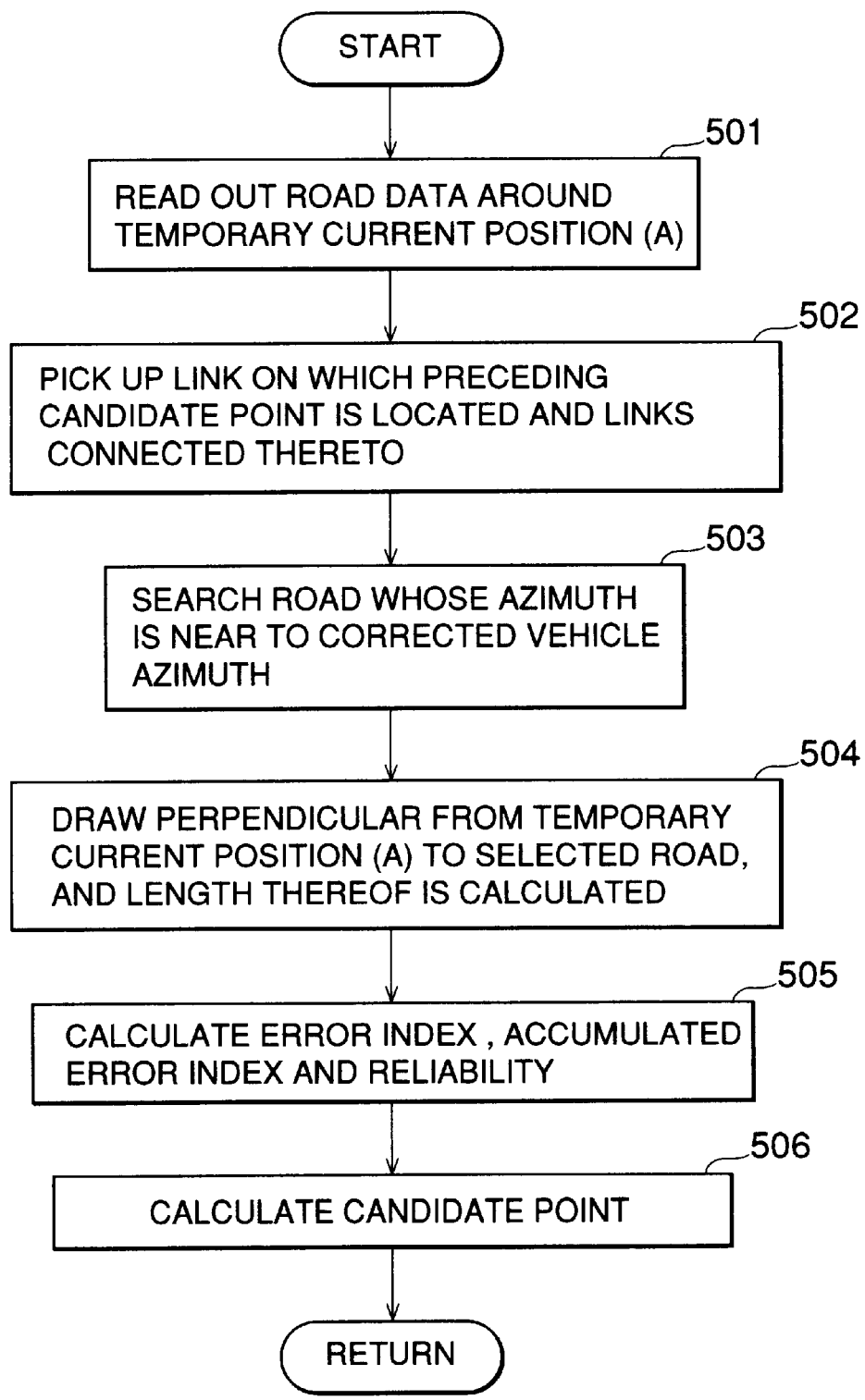
FIG. 6 is a flowchart showing the process flow of road search processing of a candidate point under a matching state.

First, the road search processing of the step 404 will be described. FIG. 6 shows the details of the road search processing of the step 404.

This processing is performed on each matched candidate point which is obtained in the preceding straight line advance processing or the turn finish processing.

In the road search processing, a map surrounding a temporary current position (A) which is obtained in correspondence with a preceding matched candidate point serving as a target to be processed is read out from the CD-ROM 15 through the driver 16 and the DMA controller 23 (step 501). Thereafter, a link on which the preceding matched candidate point serving as the processing target is located, or a link connected to the above link, is selected and picked up (step 502).

Figure 7:
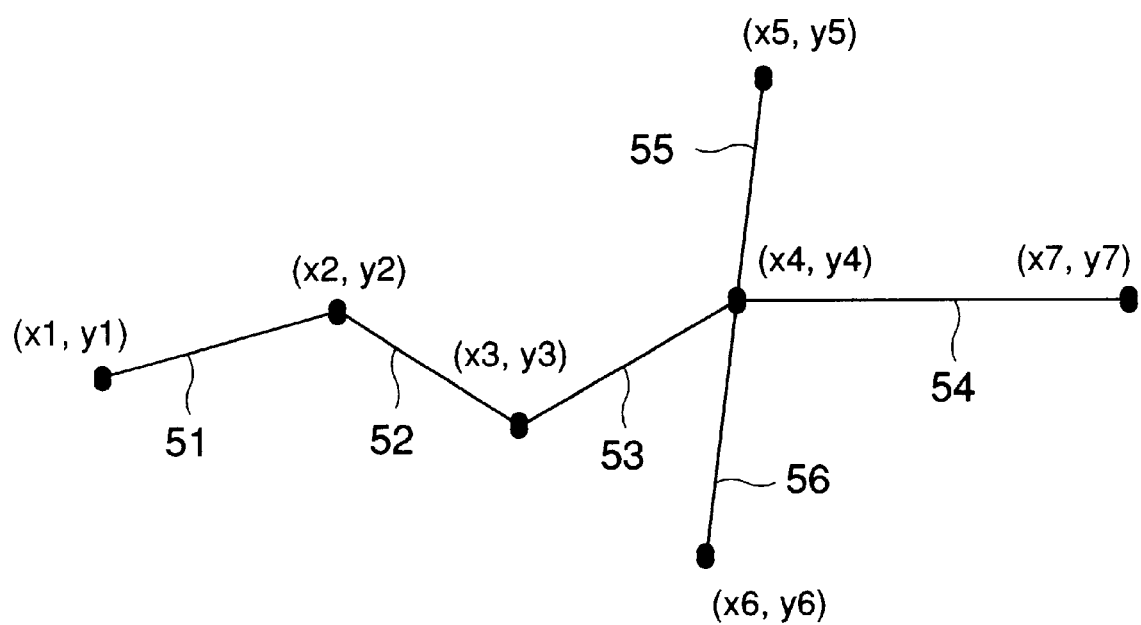
FIG. 7 is a diagram showing an expression format of a road on a road map.

As described above, according to this embodiment, plural links 51 to 56, each of which connects two points as shown in FIG. 7, are used to approximate actual roads, and the coordinate values of start and end points of each link are used as road data. For example, a link 53 is represented by the start point (x3, y3) thereof and the end point (x4, y4) thereof.

Subsequently, only links whose azimuth values are within a predetermined value with respect to the corrected vehicle azimuth θcar are selected from the links which are picked up in the step 502 (step 503), and a perpendicular line is drawn from the temporary current position (A) to each of all the links of n which are selected and picked up, and the length of the perpendicular line L(n) is calculated (step 504). Subsequently, on the basis of the length of each perpendicular line L(n), an error index value ec (n) as defined by the following equation is calculated for all the links which are selected in the step 503:

$$ec(n)=\alpha\times|\theta car-\theta(n)|+\beta\times|L(n)|$$

Here, θcar represents the vehicle travel azimuth at the temporary current position (A); θ(n), the azimuth of the link; L(n), the distance from the temporary current position (A) to the link, that is, the distance of the perpendicular line; and α and β, weighting coefficients. The values of the weighting coefficients may be varied in accordance with selection of one of the displacement between the vehicle travel azimuth and the azimuth of the road and the displacement between the current position and the road, which will be more seriously considered to select a road on which the current position is located. For example, when a road whose azimuth is near to the travel azimuth is more seriously considered, the value of α may be increased.

Subsequently, an accumulated error index es(n) of each link selected in the step 504, which is defined by the following equation, is calculated in accordance with the calculated error index ec(n) and the accumulated error index es of the preceding candidate point serving as a target to be processed (step 505):

$$es(n)=(1-k)\times es+k\times ec(n)$$

Here, k represents a weighting coefficient which is larger than zero, but smaller than 1. The accumulated error index es(n) represents how much the error index values calculated in the preceding and further preceding processings are reflected to the error index to be calculated in the current processing. Further, the reliability trst(n) defined by the following equation is calculated on the basis of the calculated accumulated error index es(n) (step 505):

$$trst(n)=100/(1+es(n))$$

As is apparent from the above equation, as the accumulated error index es(n) increases, the reliability trst(n) is reduced and approaches zero. On the other hand, as the accumulated error index es(n) is reduced, the reliability trst(n) increases and approaches 100.

With the above processing, the reliability trst(n) is calculated for each of n links which are connected to a link on which a preceding candidate point to be processed (i.e., a processing target) exists and whose azimuth is near to the vehicle travel azimuth.

Subsequently, those points which are away from the preceding candidate point to be processed at the length corresponding to the vehicle travel distance R along each of the links which are selected in the step 503, are set as new candidate points (step 506). Accordingly, when plural links (n is an integer above 2) are selected in the step 503, new candidate points C(n) whose number is equal to n are generated. In other words, plural new candidate points may be generated for each of the preceding matched candidate points.

Further, the accumulated error index es(n) of each of the links of n which are selected in the step 503 is set as the accumulated error index for a new candidate point C(n) which is obtained by shifting the preceding candidate point along the link by the distance R.

Figure 8:
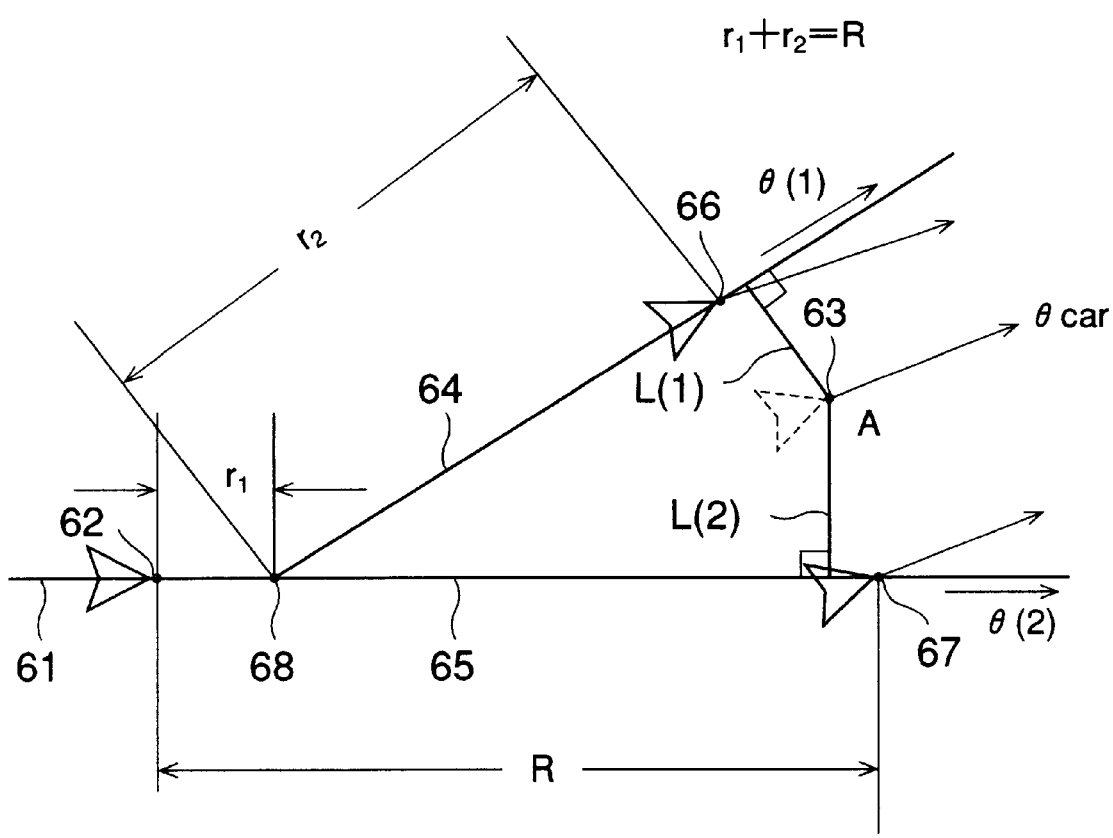
FIG. 8 is a diagram showing a segment of a line for a road, a temporary current position and a candidate point.
Figure 9:
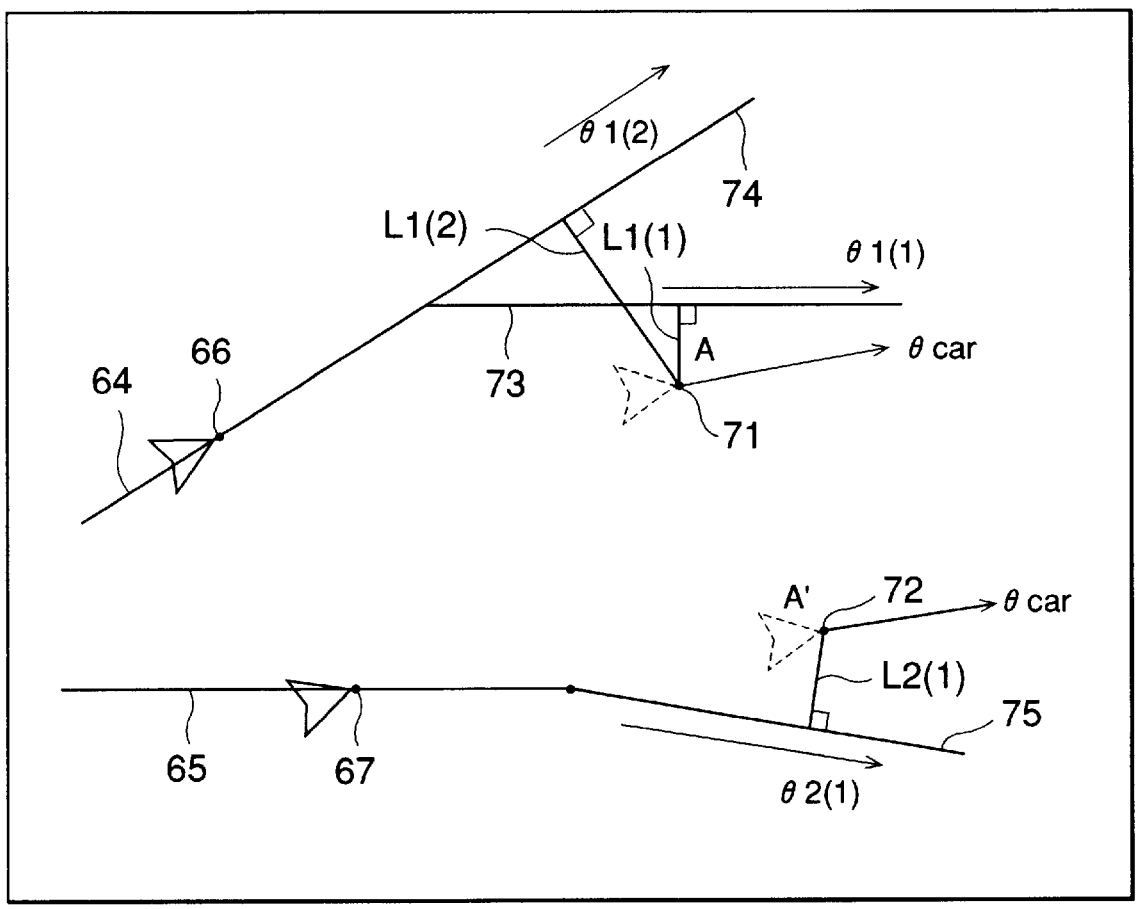
FIG. 9 is another diagram showing a segment of a line for a road, a temporary current position and a candidate point.
Figure 10:
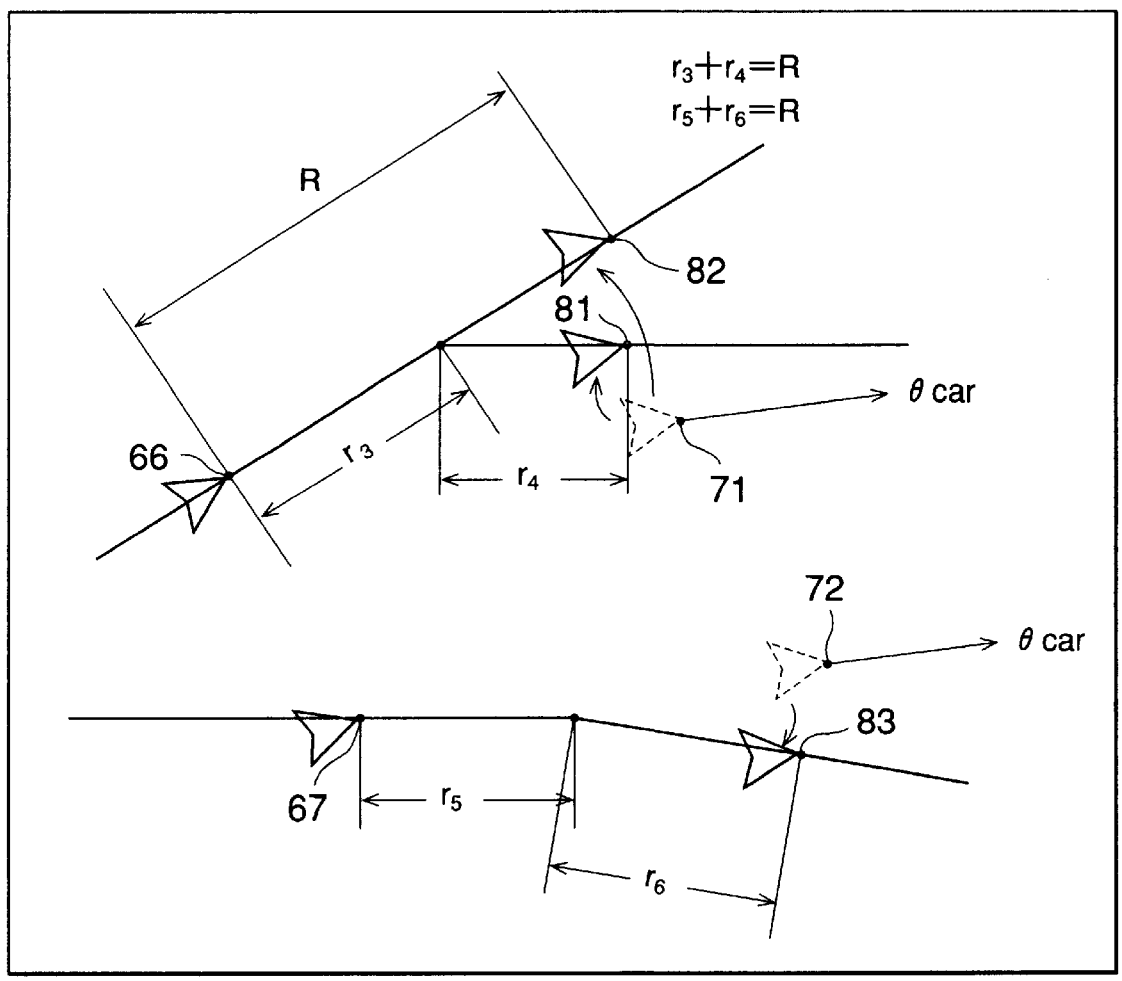
FIG. 10 is another diagram showing a segment of a line for a road, a temporary current position and a candidate point.

FIGS. 8 to 10 are diagrams for successively determining the candidate points through the above processing.

It is assumed that a temporary current position (A) for a candidate point 62 existing on a link 61 is determined to be located at a point 63 as shown in FIG. 8 by the straight line advance processing at a calculation time. In this case, links 64 and 65 which are connected to the link 61 having the candidate point 62 thereon and satisfy the following condition "the difference between the link azimuth thereof and the corrected vehicle travel azimuth ecar is below a predetermined value", are picked up on the basis of the temporary current position (A). Thereafter, each distance L(1), L(2) from the temporary current position (A) to the link 64, 65 is calculated, and the error index, the accumulated error index and the reliability in connection with the temporary current position (A) are calculated on the basis of the calculated distance, the angle θ(1), θ(2) of the link 64, 65, and the corrected vehicle travel azimuth θcar. Further, the candidate point 62 is shifted along the links 61 and 64 or along the links 61 and 65 by the length corresponding to the vehicle travel distance which is previously calculated, and the positions which are obtained by the above shift operation are set as candidate points 66, 67.

In the next straight line advance processing, a new temporary current position (A) for the candidate point 66 on the link 64 is presumed to be located at a point 71 as shown in FIG. 9. Further, a temporary current position (A') for the candidate point 67 on the link 65 is presumed to be located at a point 72. In this case, links 73 and 74 which are connected to the link 64 having the candidate point 66 thereon and satisfy the following condition "the difference between the link azimuth thereof and the corrected vehicle travel azimuth θcar is below a predetermined value", are picked up on the basis of the new temporary current position (A), and a link 75 which is connected to the link 65 having the candidate point 67 thereon and satisfy the following condition "the difference between the link azimuth thereof and the corrected vehicle travel azimuth θcar is below a predetermined value", is picked up on the basis of the new temporary current position (A'), Subsequently, the distance L1(1) from the temporary current position (A) to the link 73 and the distance L1(2) from the temporary current position (A) to the link 74 are calculated, and the distance L2(1) from the temporary current position (A') to the link 75 is calculated. Further, the error index, the accumulated error index and the reliability in connection with the temporary current position A are calculated on the basis of the distance, the angles θ1(1) and θ1(2) of the links 73 and 74 and the corrected vehicle travel azimuth θcar which are calculated in connection to the temporary current position A, and the error index, the accumulated error index and the reliability in connection with the temporary current position A' are calculated on the basis of the distance, the angle θ2(1) of the link 75 and the corrected vehicle travel azimuth θcar which are calculated in connection to the temporary current position A'.

Further, the candidate point 66 is shifted along the links 64 and 73 or along the links 64 and 74 by the vehicle travel distance R, or the candidate point 67 is shifted along the links 65 and 75 by the vehicle travel distance R to set the positions thus obtained as new candidate points. The new candidate points 81 to 83 thus obtained are shown in FIG. 10.

All the candidate points which are obtained in the above processing are matched candidate points which are matched onto roads.

On the other hand, it may be considered that no link exists (to be selected in the step 503) on which the preceding matched candidate serving as the processing target is to be located or which is connected to a link on which the above preceding matched candidate is located. In this case, the temporary current position (A) is set as a next candidate point which is calculated on the basis of a candidate point.

Such a candidate point is a candidate point which is not matched onto a road, and thus it is a free candidate point. In the step 505, the free candidate point is supplied with a constant value which is larger than the value of the error index which would possibly be given to a matched candidate point as an error index ec(n).

The above detailed description is given for the road search processing for performing the road matching on only the preceding matched candidate points in the step 404 of FIG. 5.

Next, the details of the road search processing for performing the road matching on only the free candidate points as described later, which are obtained in the just-previous straight line advance processing or the turn finish processing in the step 403 of FIG. 5, will be described hereunder.

Figure 11:
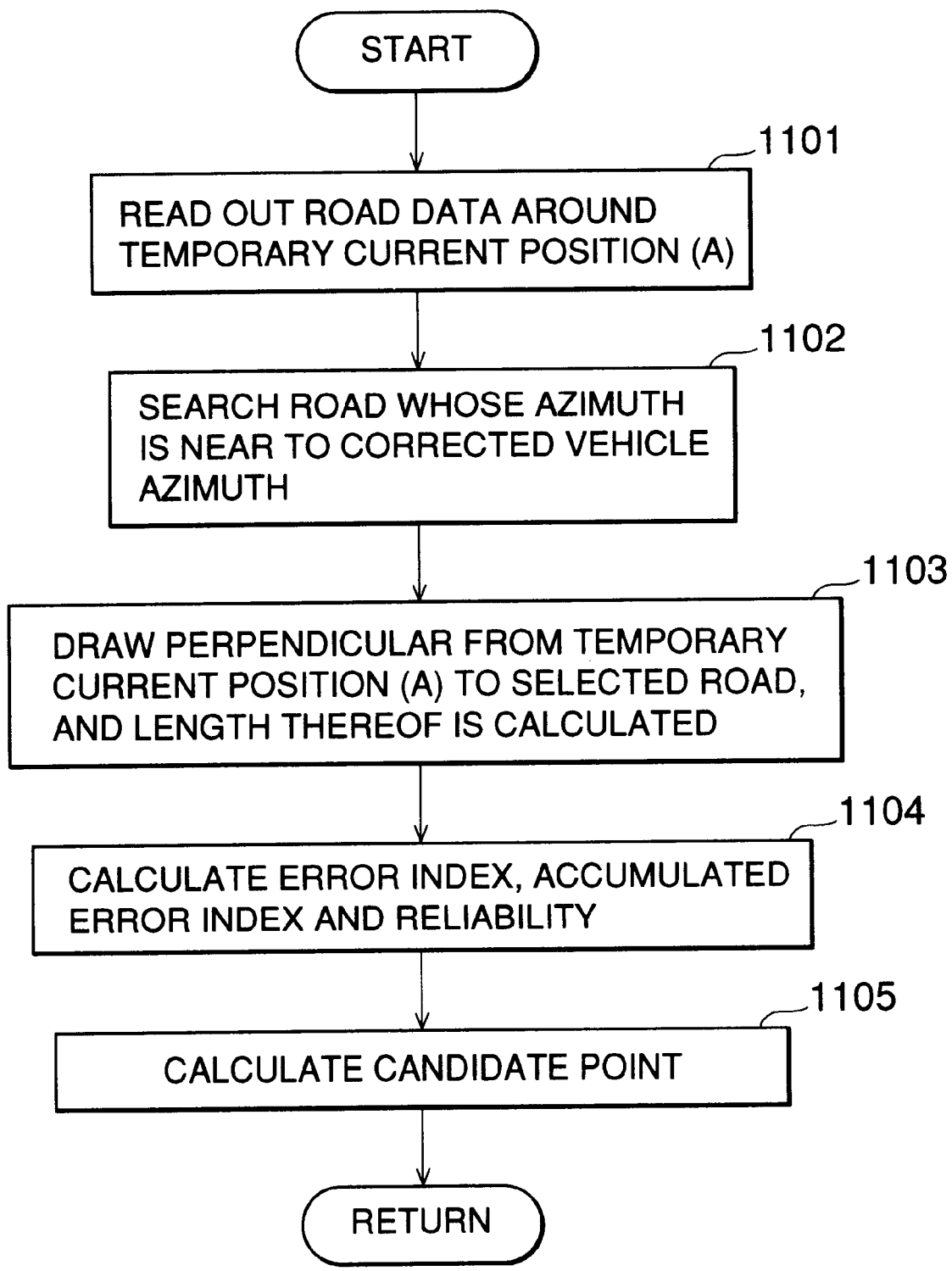
FIG. 11 is a flowchart showing the process flow of a road search processing of a candidate point under a free state.

FIG. 11 shows a flowchart for the road search processing for the preceding free candidate points. This processing is performed for each of the free candidate points which are obtained in the preceding straight line advance processing or turn finish processing.

As shown in FIG. 11, this processing is similar to the road search processing for the matched candidate points shown in FIG. 6.

The difference between these processings is as follows. In the road search processing, links on which candidate points obtained in a preceding processing for obtaining candidate points are located, or links connected to the above links are picked up, and links whose azimuth is different from the corrected vehicle azimuth θcar by a predetermined value or less are selected from the above links (the steps 502 and 503 of FIG. 6). On the other hand, in the road search processing for the free candidate points, all links which are located away from the temporary current position (A) at a distance D or less are extracted, and links whose azimuth is different from the corrected vehicle azimuth θcar by a predetermined value or less are selected from these links (step 1202).

That is, in the processing of the steps 502 and 503 of FIG. 6, a single link or some links extending from a branch point may be picked up. However, in the processing of the step 1102 shown in FIG. 11, links to be extracted are determined from road data in the map corresponding to read-out map data.

Further, in the road search processing for the free candidate points, in the case where a link whose azimuth is different from the vehicle travel azimuth θcar by a predetermined value or less exists within a predetermined area D from the temporary current position (A) for a preceding free candidate point which serves as a processing target, the intersection point between the link and a perpendicular line drawn from the temporary current position to the link concerned is set as a new matched candidate point. Further, the temporary current position (A) for the preceding free candidate point serving as the processing target is also set as a free candidate point.

In the case where any link whose azimuth is different from the vehicle travel azimuth θcar by a predetermined value or less does not exist within a predetermined area D from the temporary current position (A) for the free candidate point, only the point corresponding to the temporary current position is set as a free candidate point.

The calculation method for the error index ec, the accumulated error index es and the reliability trst of each candidate is identical to that used in the road search processing for the matched candidate point as described above.

The above description is given for the straight line advance processing.

Next, the details of each of the turn start processing, the under-turn processing and the turn finish processing will be described hereunder.

Figure 12:
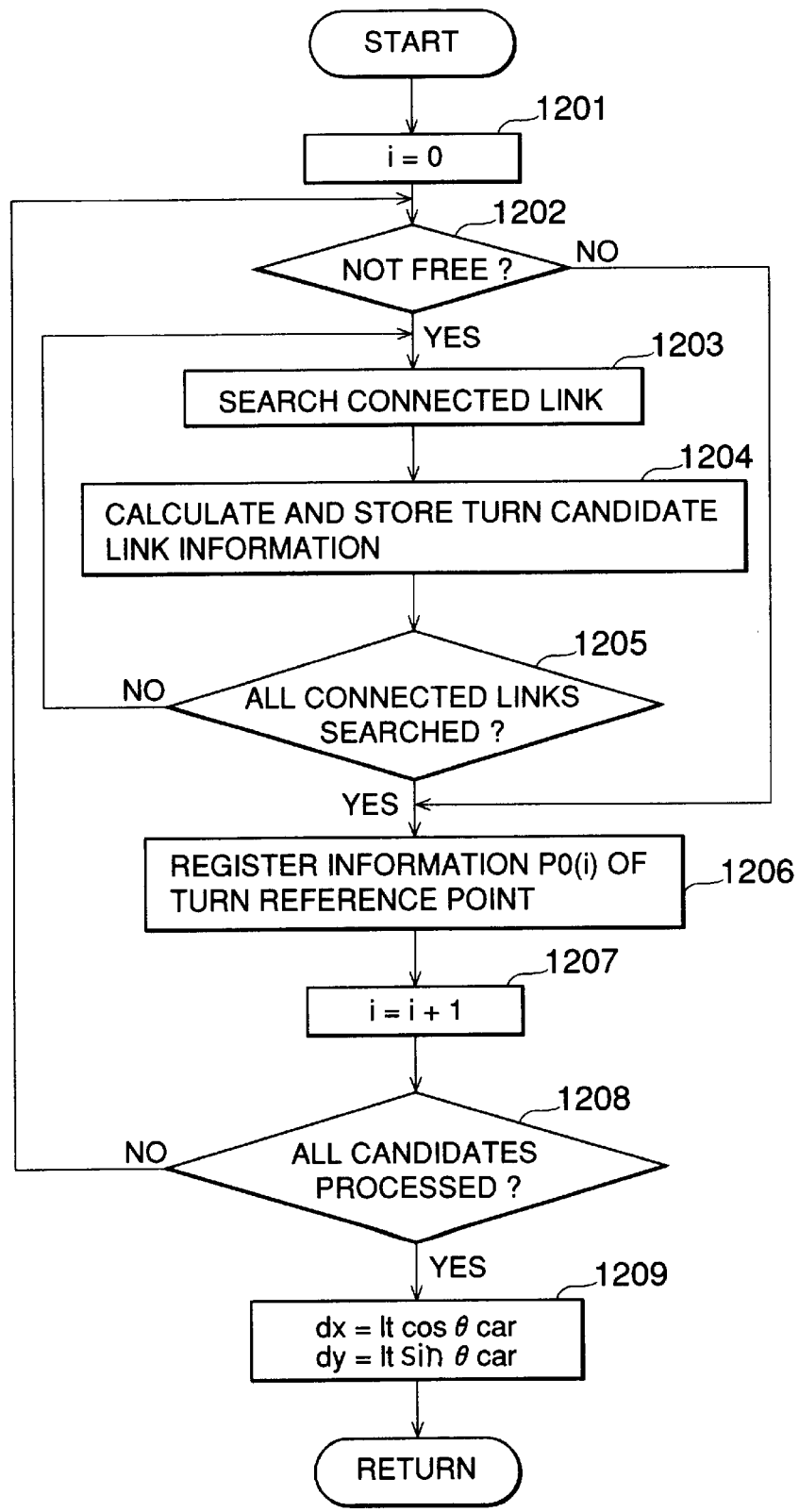
FIG. 12 is a flowchart showing the process flow of the turn start processing.
Figure 13:
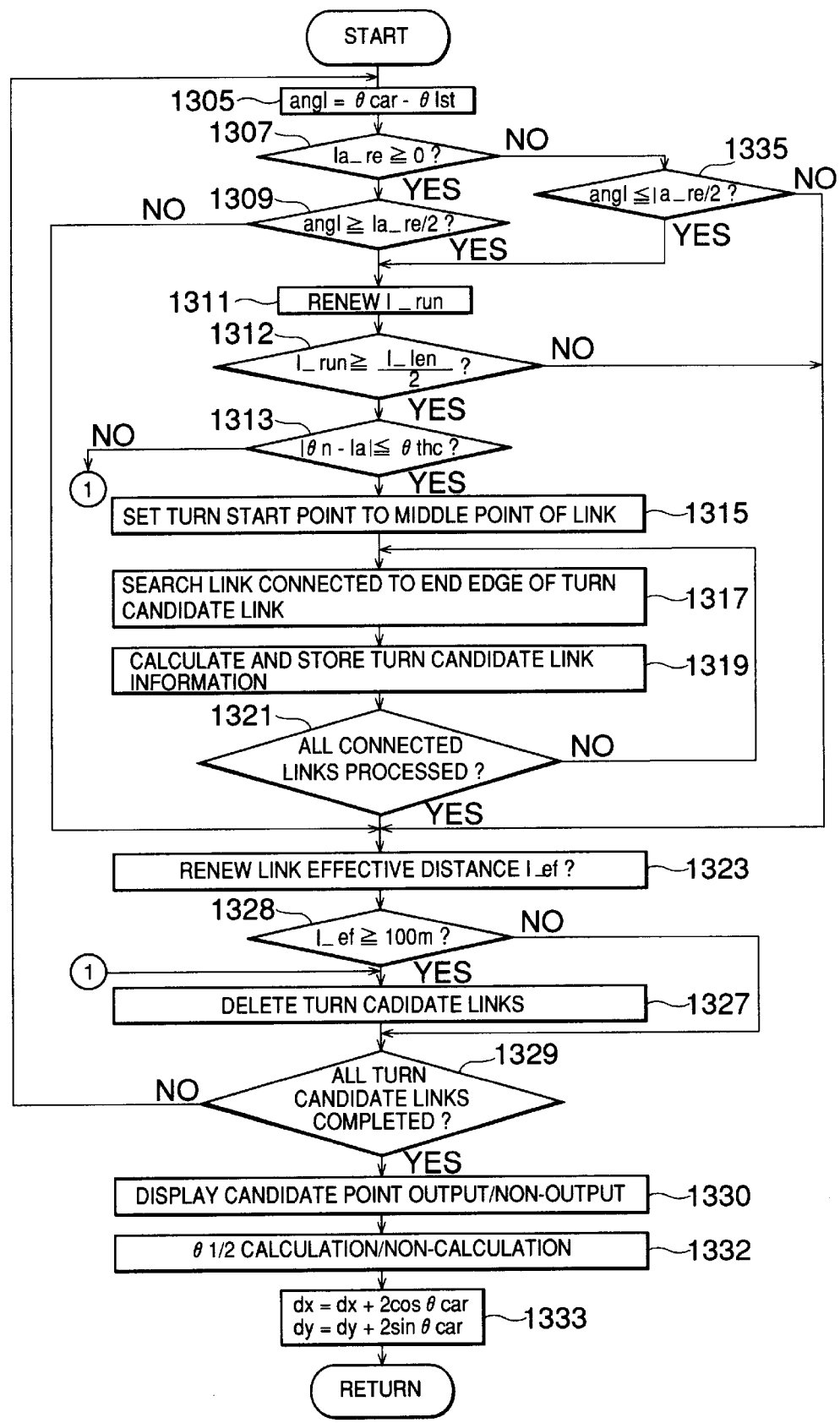
FIG. 13 is a flowchart showing the process flow of the under-turn processing.
Figure 14:
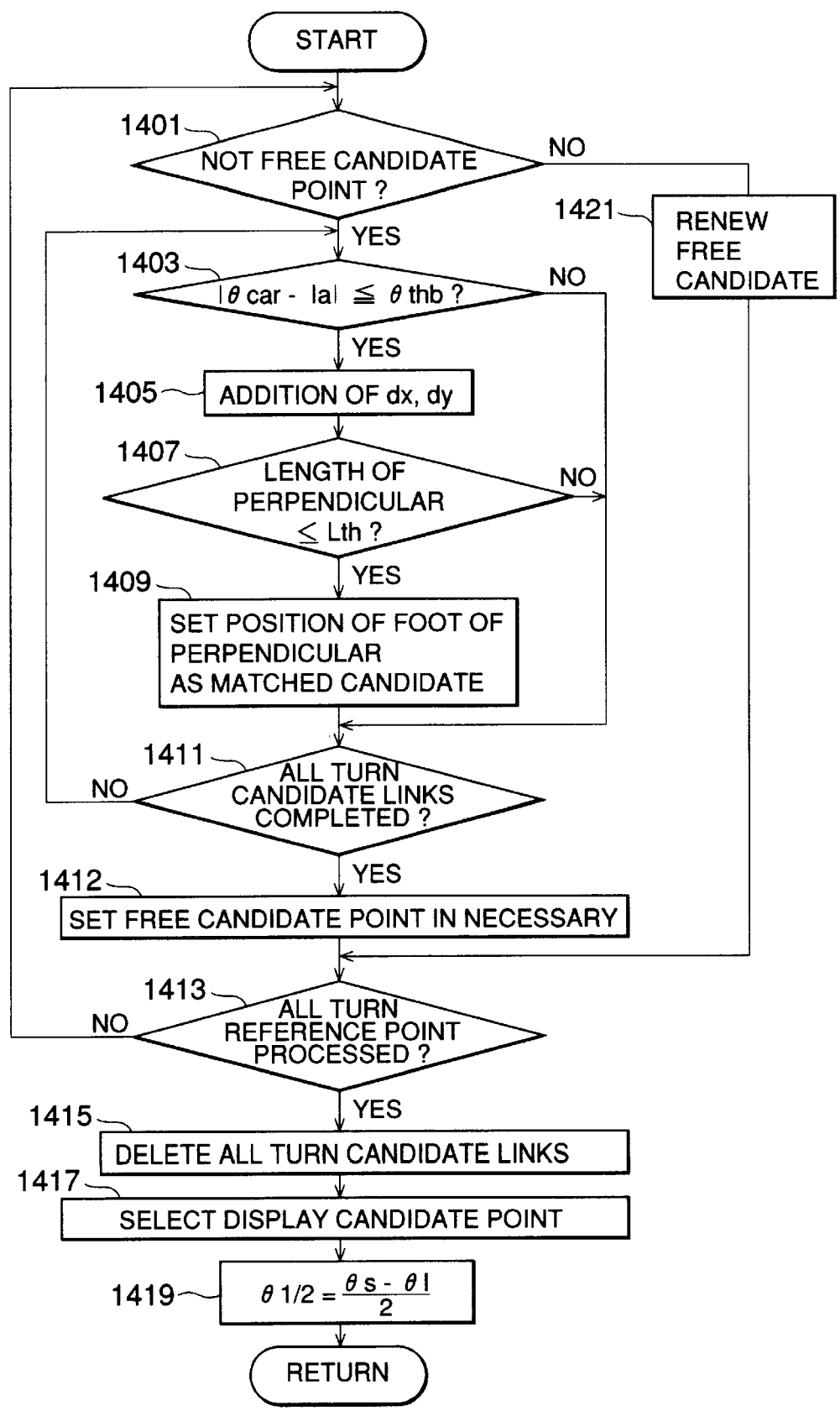
FIG. 14 is a flowchart showing the process flow of the turn finish processing.

FIG. 12 shows a flowchart for the turn start processing, FIG. 13 shows a flowchart for the under-turn processing, and FIG. 14 shows a flowchart for the turn finish processing.

The turn start processing, the under-turn processing and the turn finish processing are performed in this order between the sequential straight line advance processings, typically like straight line advance processing—turn start processing—under-turn processing—turn finish processing—straight line advance processing.

Therefore, it will be first described how the straight line advance processing as described above is linked to the turn start processing, the under-turn processing and the turn finish processing.

In the turn start processing immediately after the straight line advance processing, there exist one or plural candidate points which are obtained in the just preceding straight line advance processing, as described above.

In the turn start processing, different values of i are given to the respective candidate points which are obtained in the just preceding straight line advance processing by the processing in steps 1201, 1207 and 1208 in FIG. 12, and the processing of a step 1206 is performed on each candidate point. In the processing of the step 1206, the coordinate value of each candidate point, the accumulated error index es and information as to whether the candidate point is a free candidate or matched candidate are stored as information P0(i) of a turn reference point. "i" of P0(i) represents the value of i which is a value given to the candidate point.

Thereafter, at step 1209 in FIG. 12, a vehicle travel distance in an X-direction and a vehicle travel distance in a Y-direction at which the vehicle travels after the just-preceding straight line advance processing is carried out are calculated on the basis of the corrected vehicle travel azimuth angle θcar, and these calculated values are set as dx and dy. "It" in the step 1209 of FIG. 12 represents a vehicle travel distance at which the vehicle runs after the just-preceding straight line advance processing is performed.

On the other hand, in the under-turn processing, the vehicle travel distance is successively accumulated in dx, dy in step 1333 of FIG. 13 so that dx and dy can represent the vehicle travel distances in the X and Y directions after the just-preceding straight line advance processing at all times.

With this processing, at the time when the turn finish processing is performed, dx and dy represent the vehicle travel distance in the X direction and the vehicle travel distance in the Y direction respectively from the time when the just-preceding straight line advance processing is performed until the time when the turn finish processing is performed.

In the turn finish processing, the coordinate value, the accumulated error index es and the information representing the free candidate point or the matched candidate point for the candidate point which are obtained in the just-preceding straight line advance processing stored as P0(i) (the information of the turn reference point) in the turn start processing, are successively read out. For the turn reference point which is a free candidate point (in the case of "No" judgment in step 1401), the X and Y coordinate values of the candidate point are added with dx and dy, and the coordinate point thus obtained is set as a new free candidate point. Further, the error index ec, the accumulated error index es and the reliability trst(n) for the above candidate point are calculated in the same manner as used to calculate the error index ec, the accumulated error index es and the reliability trst for the free candidate point in the straight line advance processing as described above (step 1421). However, the accumulated error index es stored as P0(i), the accumulated error index es of the candidate point which is the turn reference point, is used as the preceding accumulated error index es which is used to calculate the accumulated error index es.

Further, for the turn reference point which is a matched candidate point, a turn candidate link for the turn reference point is first successively extracted (step 1413), and it is judged whether the absolute value of the difference between the azimuth of the turn candidate link and the current vehicle travel azimuth θcar is below a predetermined value θthb (step 1403). The turn candidate link is defined as a link on which the current position can be probably located and which is selected in the turn-proceeding processing as described later from links which are connected to a link on which the matched candidate point serving as the turn reference point exists. The details of this turn candidate link will be described in detail.

For the matched candidate point, the coordinate obtained by adding dx, dy to the X,Y coordinates stored as the information P0(i) of the turn reference point in the turn start processing is calculated (step 1405), and a perpendicular line is drawn from the point of the coordinate thus calculated to each turn candidate link in which the absolute value of the difference between the azimuth thereof and the current vehicle travel azimuth θcar is below the predetermined threshold value θthb. If the length of the perpendicular line is below a predetermined threshold value Lth (step 1407), the position of the foot of the perpendicular line (the intersection point of the perpendicular line with the turn candidate link) is set as a new matched candidate point, and the error index ec, the accumulated error index es and the reliability trst for the new matched candidate point are calculated in the same manner as used to calculate the error index ec, the accumulated error index es and the reliability trst for the matched candidate point in the straight line advance processing as described above. However, the accumulated error index es stored in the P0(i), that is, the value of the accumulated error index es of the candidate point serving as the turn reference point, is used as the preceding accumulated error index es used to calculate the accumulated error index es.

There may be a case where the absolute value of the difference between the azimuth of the turn candidate link and the current vehicle travel azimuth θcar is below the predetermined threshold value θthb and there is no perpendicular line satisfying the following condition "the length of the perpendicular line drawn from the coordinate point to the turn candidate link is below the predetermined threshold value Lth". In this case, the same treatment as applied to the turn reference point which is the free candidate point is applied. That is, the point of the coordinates obtained by adding dx, dy to the X,Y coordinates stored as the information P0(i) of the turn reference point in the turn start processing is set as a new free candidate point (step 1412).

When the above processing is completed for all the turn reference points (step 1413), all the turn candidate links are deleted (step 1415), and a candidate point having the highest reliability is selected as a display candidate point from the new candidate points thus obtained, and the coordinate of the candidate point is output as the coordinate of the display candidate point (step 1417). Further, θ½ is calculated like the case of the straight line advance processing (step 407 of FIG. 5) (step 1419).

As a result, at the time when the turn finish processing is finished, one or plural candidate points are obtained like when the straight line advance processing is finished. Accordingly, in the straight line advance processing just after the above processing, these candidate points can be used as preceding candidate points.

The turn start processing, the under-turn processing and the turn finish processing may be performed at plural times in this order between the sequential straight line advance processings, for example, like straight line advance processing—turn start processing—under-turn processing—turn finish processing—turn start processing—under-turn processing—turn finish processing—straight line advance processing. In this case, in the second turn start processing, the same processing as described above is performed while each candidate point which is obtained in the just-before turn finish processing is used as a preceding candidate point.

The vehicle travel distance after the turn start processing which is obtained on the basis of dx, dy may be reflected to the value of the error index ec of a new candidate point to be obtained in the turn finish processing. That is, since it is considered that as the travel distance increases, an error or the like is more accumulated and thus a possibility that a proper candidate point is obtained at a turn finish position is reduced, the error index ec may be set to increase as the travel distance increases so that the reliability is reduced as the travel distance increases.

The above description is given on how the straight line advance processing as described above is linked to the turn start processing, the turn proceeding processing and the turn finish processing.

Next, the display candidate point output in the under-turn processing and the turn candidate link as described above which are obtained in the turn start processing and the under-turn processing, will be described hereunder.

First, parameters used in the following description will be described with reference to FIG. 15.

In the turn start processing and the under-turn processing, a point which is called "turn start point" as described later is set on a link. In the turn start processing, a link on which the turn start point exists and links which are directly or indirectly connected to the link concerned and located within a predetermined region are extracted as turn candidate links. Further, in the under-turn processing, a link which is connected, at the forward side of the vehicle in the vehicle travel direction, to the link on which the turn start point is located, is extracted as a turn candidate link. In addition, a connection point distance I_cn, a turn start vehicle azimuth $\theta$1st, a turn candidate link length I_len, a link relative angle la_re, a turn link azimuth la, a travel distance on turn candidate link I_run, and a turn candidate link effective distance I_ef are defined for each turn candidate link.

Figure 15:
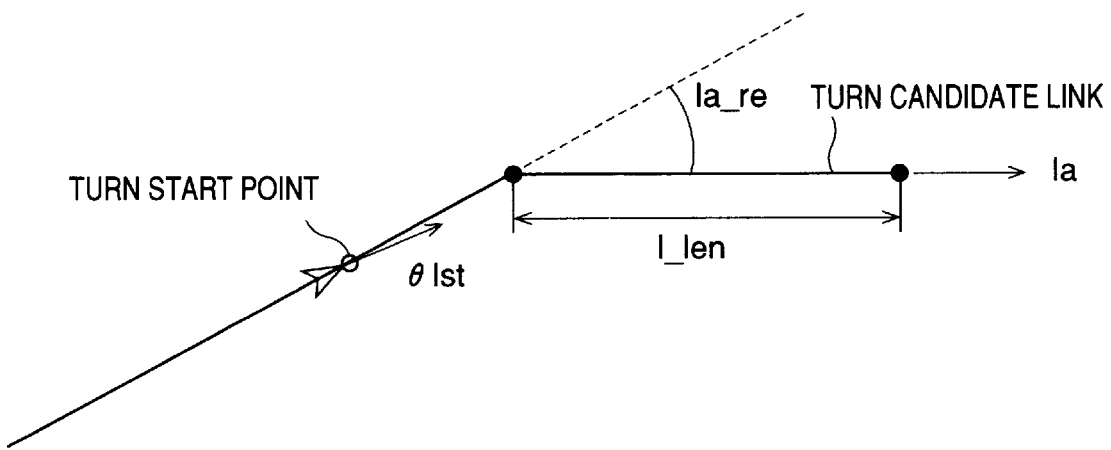
FIG. 15 is a diagram showing the meaning of various parameters which are used in the turn start processing and the under-turn processing.

As shown in FIG. 15, the turn start vehicle azimuth $\theta$1st represents a vehicle travel azimuth at the time when the turn start point serving as a reference to obtain the turn candidate link is calculated, the turn candidate link length I_len represents the length of the turn candidate link, and the turn candidate link azimuth la represents the azimuth of the turn candidate link. The link relative angle la_re represents the difference between the azimuth la of the turn candidate link and the azimuth of the link on which the turn start point corresponding to the turn candidate link is located. The travel distance on turn candidate link I_run represents a distance at which the vehicle is presumed to run on a turn candidate link until now, on the assumption that the vehicle runs from a turn start point serving as a reference to calculate the turn candidate link to the turn start candidate link. The turn candidate link effective distance I_ef represents a vehicle travel distance from the time when the turn start point serving as the reference to calculate the turn candidate link is obtained.

Figure 16:
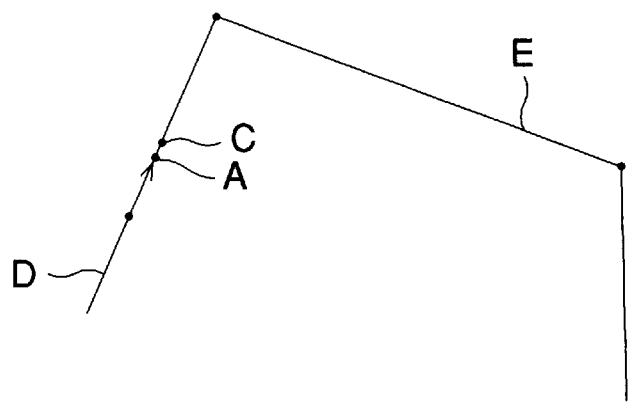
FIG. 16 is a diagram showing formation of a linkage of candidate points.

Next, the determination of the turn candidate link and the display candidate point through the turn start processing and the under-turn processing will be described with reference to FIG. 16.

In the turn start processing, the following processing as shown in FIG. 12 is performed for each of matched candidate points in currently existing candidate points (candidate points which are obtained in the just-before straight line advance processing or the turn finish processing).

That is, the position which is obtained by shifting the matched candidate point on a link by a vehicle travel distance from the time when the candidate point is calculated is set as a turn start point, and a link on which the turn start point is located and all links which are directly or indirectly connected to the link concerned and located within a predetermined range, are extracted as turn candidate links (steps 1203, 1205). Further, the turn start vehicle azimuth $\theta$1st, the turn candidate link length I_len, the link relative angle la_re, and the turn link azimuth la for each turn candidate link are calculated, and the turn start vehicle azimuth $\theta$1st, the turn candidate link length I_len, the link relative angle la_re, and the turn link azimuth la thus calculated are stored in correspondence with each extracted turn link.

When the information P0(i) of the turn start reference point in the step 1206 as described above is stored, the information representing the turn candidate link generated in the processing of the steps 1203 to 1205 which is performed for the matched candidate point corresponding to the turn reference point is stored in correspondence with the turn reference point.

With the processing as described above, as shown in FIG. 16, a turn start point C and three turn candidate links, that is, a link on which the turn start point C is located and two links D and E are determined for a matched candidate point A. A link at a rear side of the vehicle in the vehicle travel direction is also selected in consideration of a possibility that the position of the matched candidate point A is excessively advanced or delayed.

In the turn start processing, the coordinate, etc. of the display candidate point are not output.

Subsequently, as shown in FIG. 13, the following processing is performed for each turn candidate link existing at that time (step 1329).

That is, the difference between the vehicle travel azimuth $\theta$car at that time and the turn start vehicle travel azimuth $\theta$1st is first calculated, and the calculation result is set as angl (step 1305). Thereafter, it is judged whether the link relative angle la_re is positive and angl is larger than a half of the value of the link relative angle la_re (steps 1307, 1309), and it is also judged whether the link relative angle la_re is negative and angl is smaller than a half of the value of the link relative angle la_re (steps 1307, 1335). If at least one of the above judgments is "Yes", it is judged that the vehicle has already arrived at the connection point between the turn candidate link and a link on which the turn start point serving as a reference to calculate the turn candidate point concerned is located, so that the travel distance on turn candidate link I_run is added with 2 m which is an execution interval of the under-turn processing to renew the travel distance on turn candidate link I_run so as to represent the travel distance from the time when the vehicle has passed over the connection point (step 1311).

Here, the reason why the counting of the travel distance on turn candidate link I_run is started after the steps 1307 and 1309/1335 are satisfied is as follows. That is, the shape of a curve or the like is approximated with lines on a road map, so that at a connection point between a link and a subsequent link, an actual road can be presumed to have an intermediate azimuth between the azimuth of the link and the azimuth of the subsequent link. Therefore, at the time when the vehicle is oriented along the intermediate azimuth, the vehicle is presumed to have arrived at the connection point to the turn candidate link.

The travel distance I_run on the turn candidate link is renewed in step 1311, and it is then judged whether the travel distance on the turn candidate link I_run exceeds half of the turn candidate link length I_len (step 1312). If it exceeds half, it is judged whether the absolute value of the difference between the vehicle azimuth $\theta$car at that time and the turn candidate link azimuth Ia is below a predetermined value $\theta$thc (step 1313). If the absolute value is below the predetermined value $\theta$thc, the middle point of the turn candidate link is set as a new turn start point, and the processing for generating a new turn candidate link is performed in the same manner as the turn start processing. That is, all the links which are directly connected in front of the vehicle in the vehicle travel direction to the link on which the turn start point is located, are extracted as turn candidate links (steps 1317, 1321), and the turn start vehicle travel azimuth $\theta$1st, the turn candidate link length I_len, the link relative angle la_re and the turn link azimuth la are calculated for each turn candidate link, and the turn start vehicle travel azimuth $\theta$1st, the turn candidate link length I_len, the link relative angle la_re and the turn link azimuth la thus calculated are stored in correspondence with each extracted turn link (step 1319).

Further, the information representing the turn candidate link thus generated is stored in connection with a turn start reference point to which the turn candidate link serving as an origin to generate the turn candidate link concerned is connected. This connection is used when the turn candidate link corresponding to each turn reference point is extracted.

Figure 17:
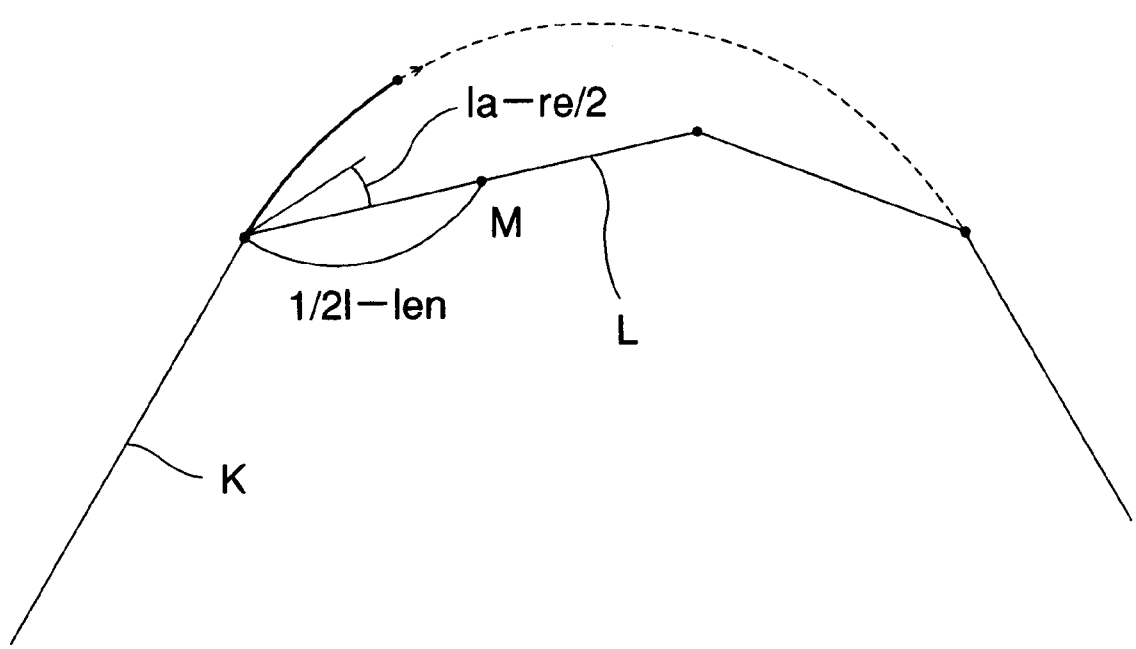
FIG. 17 is a diagram showing a method of setting a turn start point in the under-turn processing.

As described above, according to this embodiment, as shown in FIG. 17, on the assumption that the vehicle runs on a next link L after the vehicle travel azimuth exceeds an intermediate azimuth between the azimuth of a link K having a position at which the vehicle is presumed to start its turn and the azimuth of a next link L, the difference between the vehicle travel azimuth and the link azimuth is calculated when the vehicle runs on the next link L by the distance corresponding to half of the distance of the next link L. If the difference is below a predetermined value, the vehicle is presumed to have arrived at the position corresponding to an middle point M of the next link L to set the position of the middle point M as the current position.

The reason why the vehicle travel azimuth is compared with the intermediate azimuth between the two connected links is as follows. As described above, the shape of a curve or the like is approximated with links on a road map, so that at a connection point between a link and a subsequent link, an actual road can be presumed to have an intermediate azimuth between the azimuth of the link and the azimuth of the subsequent link. Therefore, it is considered that the vehicle does not advance onto the next link unless the vehicle is oriented in the intermediate azimuth.

Further, the reason why the difference between the link azimuth and the vehicle travel azimuth is calculated at the time when the vehicle runs by the distance between the start point and the middle point of the link is as follows. If the vehicle advances to the link, at the time when the vehicle runs on the link by the distance between the start point and the middle point of the link, the vehicle is located at the position of the actual road which corresponds to the middle point of the link, and the azimuth error between a position including or proximate to the middle point and the actual road is considered to be smallest. Therefore, the vehicle travel azimuth and the link azimuth are considered to be closest to each other.

In the under-turn processing, the coordinate of the turn start point which is obtained in the step 1315 is output as the coordinate of the display candidate point in step 1330. However, the step 1315 may be performed for plural turn candidate links satisfying the condition. In this case, the coordinate of the turn start point which is initially calculated is output as the coordinate of the display candidate point. Further, θ½ is calculated on the basis of the road on which the display candidate point exists and the vehicle travel azimuth θs output from the sensor as described above (step 1332).

If any turn candidate point does not satisfy the condition and no new turn start point is generated in step 1315, no display candidate point coordinate is output. Further, θ½ is not renewed.

As described above, in the under-turn processing, the turn candidate link is calculated while successively setting the turn start point at the middle point of the turn candidate link, and the turn start point is set as the display candidate point. Further, a turn candidate link having no possibility of the vehicle existing thereon is deleted as follows.

That is, in step 1323, every time the under-turn processing is performed, 2 m is added to the turn candidate link effective distance I_ref for a turn candidate link which does not satisfy the step 1309 or 1335 and the step 1312, or a turn candidate link on which a new turn start point is set at the middle point thereof in step 1315, whereby the travel distance is represented as a travel distance at which the vehicle has run from the time when the turn start point serving as a reference to calculate the turn candidate link is calculated (step 1323). If the turn candidate link effective distance I_ref exceeds 100 m, the information on the turn candidate link is deleted. That is, the information representing the turn candidate link which was previously stored in connection with the turn start reference point, and various parameters on the turn candidate link are deleted. This is because if a turn candidate link does not satisfy the step 1309 or 1335 even when the vehicle runs by 100 m, it is believed that the vehicle does not run on the turn candidate link. Further, a link having a middle point on which a turn start point was set in step 1315 has not been required, and thus this link is also deleted at the time when the vehicle runs by 100 m from the time when the turn candidate link is generated.

Further, with respect to the turn start candidate links which satisfy the step 1309 or 1335 and the step 1312, but do not satisfy the following condition "the difference between the vehicle travel azimuth and the link azimuth is larger than the predetermined value", that is, do not satisfy the step 1313, since the azimuth difference is still larger than the threshold value even in the vicinity of the middle point at which the vehicle travel azimuth and the link azimuth is expected to be closest to each other, there would be no possibility of the vehicle existing on the turn candidate link, and thus these turn start candidate links are immediately deleted.

The above description is made on the turn candidate links generated in the turn start processing and the under-turn processing and the display candidate points output in the under-turn processing. As described above, it should be considered that the turn start point generated in the turn start processing and the under-turn processing and the display candidate point output in the under-turn processing have no effect on the subsequent turn finish processing, and only the turn reference point, the vehicle travel distance (dx, dy) and the finally residual turn candidate links are used for the turn finish processing.

The above description relates to the details of the turn start processing, the under-turn processing and the turn finish processing.

Finally, the display processing will be described hereunder.

Figure 18:
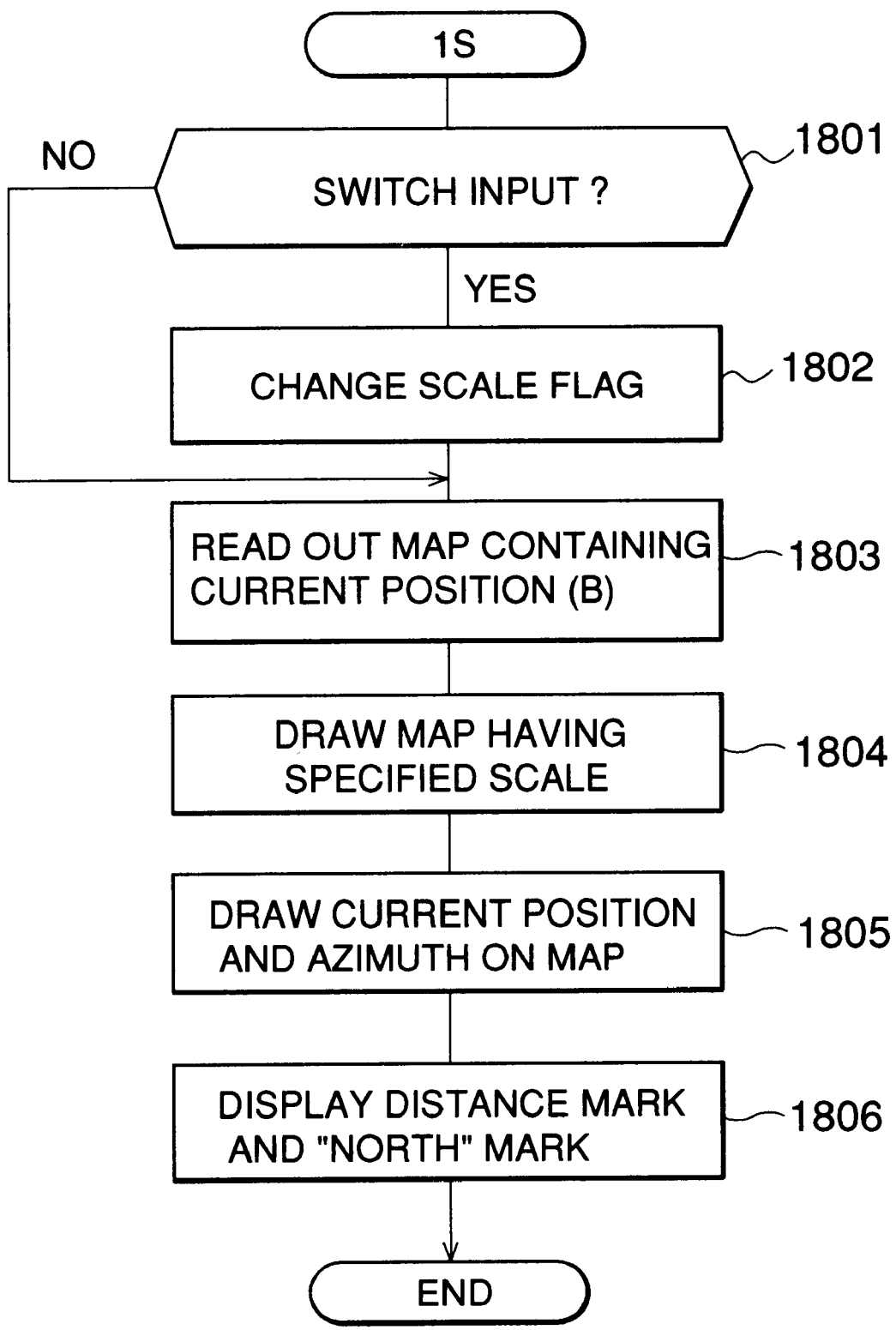
FIG. 18 is a flowchart showing the process flow of a current position display processing.

FIG. 18 shows a flowchart for the display processing.

This processing is a routine of the microprocessor 24 which is executed every one second. In this processing, it is judged on the basis of the content of the parallel I/O 21 whether the change of the map scale is instructed by pressing the switch 14 (step 1801). If the switch 14 is pressed ("Yes" judgment in step 1801), a predetermined scale flag is set (step 1802).

Subsequently, the coordinate of the display candidate point output in the straight line advance processing, the under-turn processing and the turn finish processing as described above is added with a vehicle shift amount which is calculated on the basis of the vehicle travel azimuth θcar corrected with θ½ and the vehicle travel distance at which the vehicle runs from the time when the coordinate of the display candidate point concerned is output, and the coordinate thus obtained is set as a current position (B). The current position (B) and a map containing the current position (B) are read out (step 1803), and a map whose scale is matched to the content of the scale flag which is changed in step 1802 is displayed on the display 17, for example, in such a display state as shown in FIG. 2 (step 1804).

Subsequently, the position of the current position (B) and the current vehicle travel azimuth θcar are displayed, for example, with an arrow mark "↑" as shown in FIG. 2 while superposed on the map (step 1805). Finally, a "north" mark representing the north direction and a distance mark which is matched to the set scale are displayed while superposed on the map as shown in FIG. 2 (step 1806).

Figure 19:
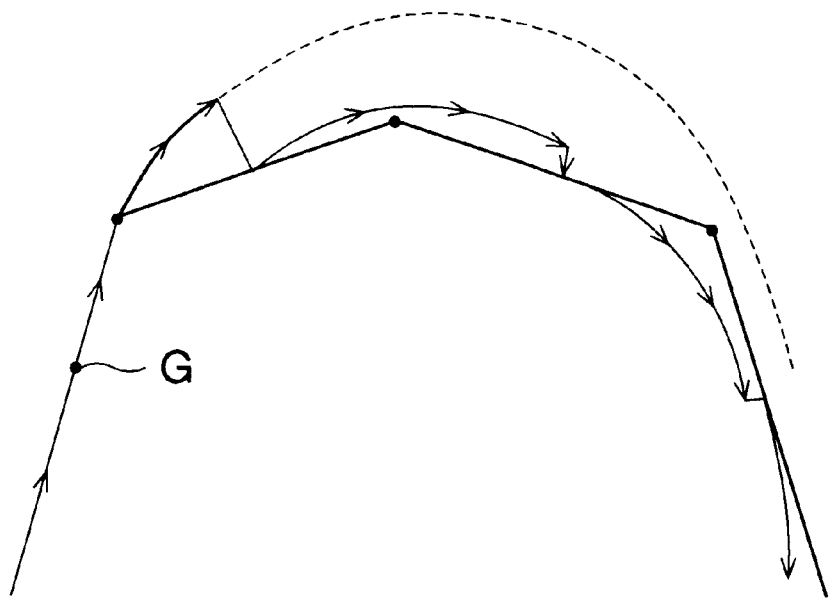
FIG. 19 is a diagram showing a display progress of the current position when the vehicle is turning in the current position display processing.
Figure 20:
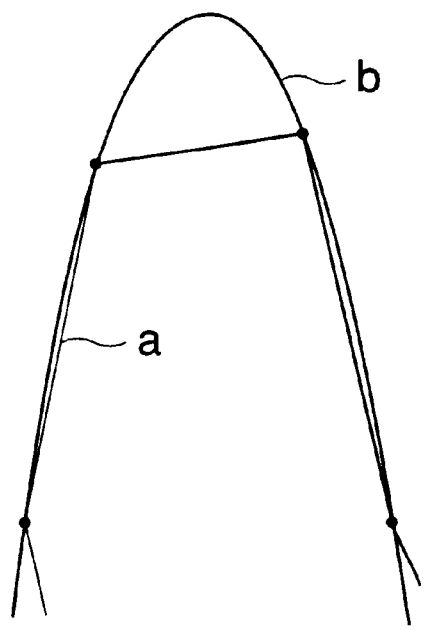
FIG. 20 is a diagram showing a road map in which a curve is approximated by a link.

Consequently, in the under-turn processing, a travel locus (broken line) of the vehicle which is drawn on the assumption that a turn start point G is set as a start position is displayed so that the display of the current position is attracted to a link every time the vehicle passes over the middle point of the link as shown in FIG. 19. Therefore, the mark representing the current position can be prevented from being displayed at a position which is far away from the link. Further, the vehicle travel azimuth θs output from the sensor is corrected with θ½ to obtain the corrected vehicle travel azimuth θcar with which the vehicle travel azimuth is made closer to the azimuth of the road, and the current position is displayed with the corrected vehicle travel azimuth θcar, so that the current position can be displayed to be nearer to the road.

The above description is given for the embodiment of the present invention.

In the above processing, the corrected vehicle travel azimuth θcar is also used in the straight line advance processing. However, the vehicle travel azimuth Es output from the sensor may be used directly in the straight line advance processing. In this case, during the straight line advance processing, that is, during the period that dir_f is equal to zero, the current position (B) is calculated on the basis of the vehicle travel azimuth θs output from the sensor in place of the corrected vehicle travel azimuth θcar, in display processing.

Furthermore, the judgment on the turn start, the under-turn, the turn finish and the straight line advance in the turn judgment processing may be performed on the basis of the vehicle travel azimuth θs output from the sensor, in place of the corrected vehicle travel azimuth θcar.

Even when the vehicle travel azimuth θs output from the sensor is used in place of the vehicle travel azimuth θcar in the turn start processing, the under-turn processing and the turn finish processing, the current position can be displayed to be nearer to the road compared with the prior art, and the current position can be set on a more accurate road after the turn finish processing is performed.

Furthermore, the calculation may be performed by using θ½=(θcar−θ1)/2+θ½' in place of θ½=(θs−1)/2. θ½' means the value of θ½ which has been set until now. With this setting, the effect of a stationary sensor error which is contained in errors between the vehicle travel azimuth θcar and the actual vehicle travel azimuth can be reduced to zero. and the vehicle travel azimuth can be made to gradually approach the road azimuth on the map. Further, even when the road map is incorrect, the vehicle travel azimuth θcar can be made to gradually approach the road azimuth on the map.

The numeric values such as 20 m, 2 m, etc. as used in the above embodiment are provided as examples, and these values are not limited to specific numeric values.

As described above, according to the present invention, a road on which the vehicle is running can be presumed even on a curve, and the current position can be displayed at a position near to the presumed road.

What is claimed is:

1. A current position calculating device, for a vehicle, for calculating a current position of the vehicle, comprising:

azimuth detecting means for detecting a travel azimuth of the vehicle at a predetermined interval;

distance calculating means for calculating a travel distance of the vehicle at a predetermined interval;

storage means for storing road maps;

travel azimuth correcting means for correcting a current travel azimuth of the vehicle detected by said azimuth detecting means;

current position calculating means for presuming a current position on a road on a basis of both a road map read out from said storage means and a relative displacement of the vehicle which is determined from a previously-presumed current position of the vehicle, a corrected current travel azimuth of the vehicle corrected by the travel azimuth correcting means and a current travel distance of the vehicle calculated by the distance calculating means; and display means for displaying the current position of the vehicle together with the road map read out from said storage means, wherein said travel azimuth correcting means calculates a difference between an azimuth of the road on which the current position is located and the current travel azimuth of the vehicle when said azimuth detecting means detects the travel azimuth of the vehicle, and corrects the current travel azimuth of the vehicle according to an amount of the differences obtained during predetermined interval so that the difference is to be reduced.

2. A current position calculating device, for a vehicle, for calculating a current position of the vehicle, including:

azimuth detecting means for detecting a travel azimuth of the vehicle at a predetermined interval;

distance calculating means for calculating a travel distance of the vehicle at a predetermined interval;

storage means for storing road maps;

travel azimuth correcting means for correcting a current travel azimuth of the vehicle detected by said azimuth detecting means;

current position calculating means for presuming a temporary current position which is calculated on a basis of a preceding set current position and a relative displacement of the vehicle determined on a basis of a corrected current travel azimuth of the vehicle corrected by the travel azimuth correcting means and a current travel distance of the vehicle calculated by the distance calculating means, and verifying the temporary current position with a road map read out from said storage means to set the most probable position on a road as a latest current position; and display means for displaying the latest current position of the vehicle together with the road on where the latest current position is located, wherein said travel azimuth correcting means corrects the current travel azimuth of the vehicle by an amount corresponding to a difference between the azimuth of the road on which the latest current position is located and the current travel azimuth of the vehicle, so that the difference is to be reduced, and when a difference between the current travel azimuth of the vehicle and the preceding detected travel azimuth of the vehicle is over a predetermined value, said current position calculating means sets as the latest current position the temporary current position determined on the basis of the preceding set current position of the vehicle and the relative displacement of the vehicle which is calculated from the corrected current travel azimuth of the vehicle and the current travel distance of the vehicle without verifying the temporary current position with the road map read out from said storage means to set the most probable position on the road as the latest current position.

3. A current position calculating device, for a vehicle, for calculating a current position of the vehicle, comprising:

azimuth detecting means for detecting a travel azimuth of the vehicle;

distance calculating means for calculating a travel distance of the vehicle;

storage means for storing road maps;

travel azimuth correcting means for correcting the travel azimuth of the vehicle detected by said azimuth detecting means;

current position calculating means for successively presuming the current position on road on a basis of both a road map read out from said storage means and a relative displacement of the vehicle which is determined from a previously-presumed current position of the vehicle, one of the vehicle azimuth detected by said azimuth detecting means or a corrected travel azimuth corrected by the travel azimuth correctly means, and the travel distance calculated by the distance calculating means;

display means for displaying the current position of the vehicle together with the road map read out from said storage means on a basis of a presumed current position; and target point arrival judgment means for successively setting, as a candidate road, a road which is connected in front of the vehicle in a vehicle travel direction to a road on which the previously-presumed current position is located, during a period when variation of one of the vehicle travel azimuth detected by said azimuth detection means or the corrected travel azimuth corrected by the travel azimuth correcting means shows that the vehicle is under turn, and judging whether the difference between the travel azimuth of the vehicle and an azimuth of the candidate road is below a predetermined value when the vehicle runs by a distance from the previously-presumed current position to a target point which is set in a vicinity of a middle point of the candidate road, wherein said travel azimuth correcting means corrects the travel azimuth detected by said azimuth detecting means by any one of an amount corresponding to a difference between an azimuth of a road on where a presumed current position is located and the travel azimuth of the vehicle detected by said azimuth detecting means when said current position calculating means presumes the current position, and an amount corresponding to past records of the differences so that the difference is to be reduced, and wherein while the variation of any one of the travel azimuth of the vehicle detected by said azimuth detecting means and the corrected travel azimuth corrected by the travel azimuth correcting means shows that the vehicle is under-turn, said current position calculating means presumes a position of the target point as the reference current position when said target point arrival judgment means judges that a difference between the travel azimuth of the vehicle and the azimuth of the candidate road is below a predetermined value.

4. The current position calculating device as claimed in claim 3, wherein said target point arrival judgment means sets, as a candidate road, a road which is connected in front of the vehicle in the vehicle travel direction only when the travel azimuth of the vehicle is below a judgement azimuth which is set between the azimuth of a preceding road on which the previously-presumed current position is located and the azimuth of the road which is connected to the preceding road in front of the vehicle in the vehicle travel direction.

5. A current position calculating device, for a vehicle, for calculating a current position of the vehicle, comprising:

azimuth detecting means for detecting a travel azimuth of the vehicle;

distance calculating means for calculating a travel distance of the vehicle;

storage means for storing road maps;

current position calculating means for presuming a temporary current position which is calculated on a basis of a preceding set current position and a relative displacement of the vehicle determined on a basis of the travel azimuth and the travel distance of the vehicle, and verifying the temporary current position with a road map read out from said storage means to set a most probable position on a road as a latest current position; and turn judgment means for judging whether the vehicle is turning, wherein if said turning judgment means judges that the vehicle is turning, said current position calculating means sets as the latest current position the temporary current position determined on a basis of a preceding set current position of the vehicle and the relative displacement of the vehicle which is calculated from the travel azimuth and the travel distance of the vehicle without verifying the temporary current position with a road map read out from said storage means to set a most probable position on a road as the latest current position.

6. The current position calculating device as claimed in claim 5, wherein said turn judgment means includes means for judging whether a difference between a current vehicle travel azimuth and an average value of past calculated travel azimuth values obtained while the vehicle runs at a constant distance is below a predetermined threshold value every time the vehicle runs at a predetermined distance, and means for judging whether the vehicle is under turn, on a basis of the number of times that it has been continuously judged until now that the difference between the current vehicle travel azimuth and the average value of past calculated travel azimuth values is below the predetermined threshold value.

7. A method for detecting turning of a vehicle for a current position calculating device, for a vehicle, for calculating a current position of the vehicle, comprising the steps of:

judging whether a difference between a current vehicle travel azimuth and an average value of past calculated travel azimuth values obtained while the vehicle runs at a constant distance is below a predetermined threshold value every time the vehicle runs at a predetermined distance; and judging a turn of the vehicle if the number of times that it has been continuously judged until now that the difference between the current vehicle travel azimuth and the average value of past calculated travel azimuth values is below the predetermined threshold value, is below a predetermined number.

8. A current position calculating device, for a vehicle, for calculating a current position of the vehicle, including:

azimuth detecting means for detecting a travel azimuth of the vehicle;

distance calculating means for calculating a travel distance of the vehicle;

storage means for storing road maps;

current position calculating means for successively presuming the current position on a road on a basis of both a road map read out from said storage means and a relative displacement of the vehicle which is determined from a previously-presumed current position of the vehicle, the travel azimuth and the travel distance;

display means for displaying the current position of the vehicle together with the road map read out from said storage means on a basis of the presumed current position; and target point arrival judgment means for successively setting, as a candidate road, a road which is connected in front of the vehicle in a vehicle travel direction to a road on which the previously-presumed current position is located, during a period when the travel azimuth of the vehicle shows that the vehicle is under turn, and judging whether a difference between the travel azimuth of the vehicle and an azimuth of the candidate road is below a predetermined value when the vehicle runs by a distance from the previously-presumed current position to a target point which is set in the vicinity of a middle point of the candidate road, wherein, when said target point arrival means judges that the difference between the travel azimuth of the vehicle and the azimuth of the candidate road is below the predetermined value, said current position calculating means presumes the position of the target point as the current position.

9. The current position calculating device as claimed in claim 8, wherein said target point arrival judgment means sets, as the candidate road, the road which is connected in front of the vehicle in the vehicle travel direction only when the travel azimuth of the vehicle is below a judgement azimuth which is set between the azimuth of the preceding road on which the previously-presumed current position is located and the azimuth of the road which is connected to the preceding road in front of the vehicle in the vehicle travel direction.

* * * * *